(12) United States Patent
Wysong et al.

(10) Patent No.: US 7,083,069 B2
(45) Date of Patent: Aug. 1, 2006

(54) BULK MATERIAL DISCHARGE ASSEMBLY WITH FEEDING APPARATUS

(75) Inventors: Douglas E. Wysong, Camden, OH (US); Michael P. Essen, Cincinnati, OH (US)

(73) Assignee: Finn Corporation, Fairfield, OH (US)

( * ) Notice: Subject to any disclaimer, the term of this patent is extended or adjusted under 35 U.S.C. 154(b) by 280 days.

(21) Appl. No.: 10/389,680

(22) Filed: Mar. 14, 2003

(65) Prior Publication Data

US 2003/0235473 A1 Dec. 25, 2003

Related U.S. Application Data

(60) Provisional application No. 60/364,543, filed on Mar. 15, 2002.

(51) Int. Cl.
B67D 5/56 (2006.01)

(52) U.S. Cl. ............... 222/129; 222/271; 222/274; 222/368; 222/414; 222/636

(58) Field of Classification Search ............ 222/368, 222/236, 636, 271, 274, 370, 312, 233, 166, 222/129, 414
See application file for complete search history.

(56) References Cited

U.S. PATENT DOCUMENTS

| | | | |
|---|---|---|---|
| 1,882,861 A | 10/1932 | Moore | |
| 2,684,785 A | 7/1954 | Waldorf et al. | |
| 2,684,788 A | 7/1954 | Bland | |
| 3,027,050 A | 3/1962 | Hansen | |
| 3,606,965 A | 9/1971 | Cortelyou et al. | |
| 3,633,331 A | 1/1972 | Reichlin | |
| 3,954,204 A | 5/1976 | Becker | |
| 4,465,239 A | 8/1984 | Woten | |
| 4,473,016 A | 9/1984 | Gust | |
| 4,514,114 A | 4/1985 | Fuss et al. | |
| 4,705,220 A | 11/1987 | Gandrud et al. | |
| 4,705,433 A | 11/1987 | Brännström | |
| 4,710,067 A | 12/1987 | Salley | |
| 4,875,811 A | 10/1989 | Merrett et al. | |
| 4,978,252 A | 12/1990 | Sperber | |
| 5,096,336 A | 3/1992 | Merrett et al. | |
| 5,181,804 A | 1/1993 | Wysong et al. | |
| 5,189,965 A | 3/1993 | Hobbs et al. | |
| 5,299,888 A | 4/1994 | Wysong et al. | |

(Continued)

FOREIGN PATENT DOCUMENTS

DE 1150319 6/1963

(Continued)

*Primary Examiner*—Joseph A. Kaufman
(74) *Attorney, Agent, or Firm*—Dinsmore & Shohl LLP

(57) ABSTRACT

Bulk material discharge assemblies comprise a bulk material hopper, a conduit for delivering an air stream to entrain with bulk material from the bulk material hopper, and a feeding apparatus for introducing additive to the conduit. The feeding apparatus comprises an additive hopper and an airlock positioned adjacent the conduit. In addition, metering apparatus are provided that comprise an axle and first and second metering wheels. A noncircular perimeter of the axle and the shape of each hub opening of each of the metering wheels cooperate to nonrotatably mount each metering wheel to the axle. The first and second metering wheel are adapted to be selectively mounted in at least one of a first relative position and a second relative position. Still further, apparatus for dispensing additive are provided that comprise an additive hopper including at least one partition for dividing the additive hopper into at least two containment areas that are substantially isolated from one another and a metering device mounted to the additive hopper.

38 Claims, 12 Drawing Sheets

U.S. PATENT DOCUMENTS

| | | |
|---|---|---|
| 5,378,047 A | 1/1995 | Merrett et al. |
| 5,556,237 A | 9/1996 | Rexius |
| 5,725,160 A | 3/1998 | Harper et al. |
| 5,725,332 A | 3/1998 | Harper et al. |
| 5,802,997 A | 9/1998 | Connell, Jr. et al. |
| 5,826,523 A * | 10/1998 | Gregor ................. 111/181 |
| 5,855,303 A | 1/1999 | Gregor |
| 5,915,312 A | 6/1999 | Meyer et al. |
| 5,944,233 A | 8/1999 | Bourne |
| 5,963,139 A | 10/1999 | Littke |
| 5,980,163 A * | 11/1999 | Gregor et al. ............. 406/144 |
| 5,996,515 A | 12/1999 | Gregor et al. |
| 6,036,406 A | 3/2000 | Rexius |
| 6,109,488 A | 8/2000 | Horton |
| 6,213,690 B1 | 4/2001 | Gregor et al. |
| 6,320,183 B1 * | 11/2001 | Gregor et al. ............ 250/222.1 |

FOREIGN PATENT DOCUMENTS

| | | |
|---|---|---|
| EP | 0678233 A1 | 10/1995 |
| EP | 0678233 B1 | 10/1995 |
| WO | WO9212619 | 8/1992 |

* cited by examiner

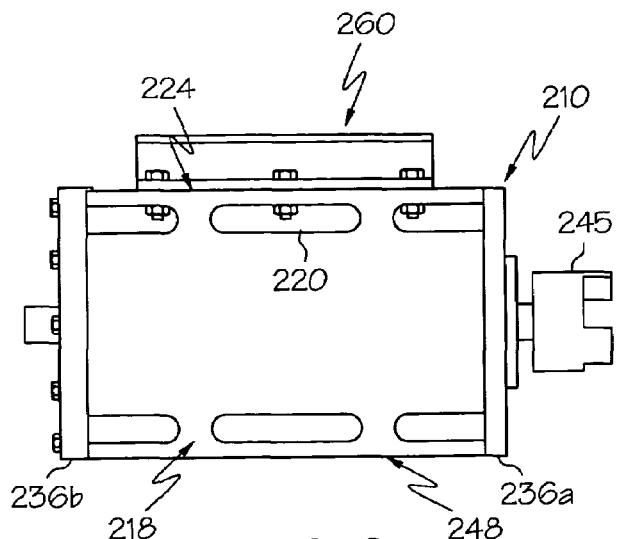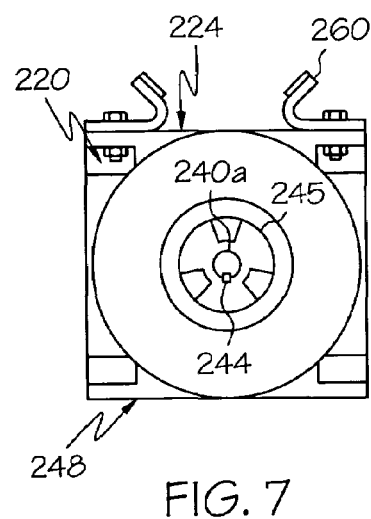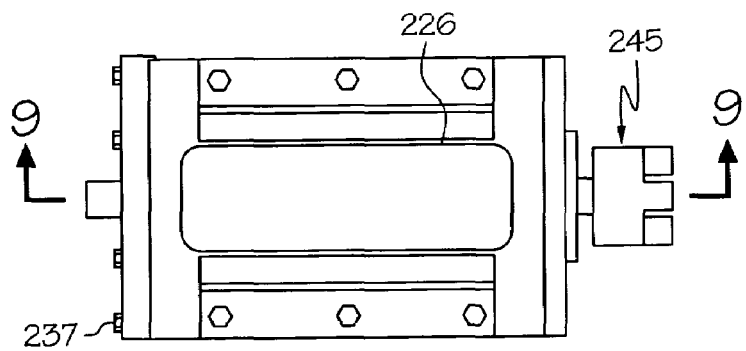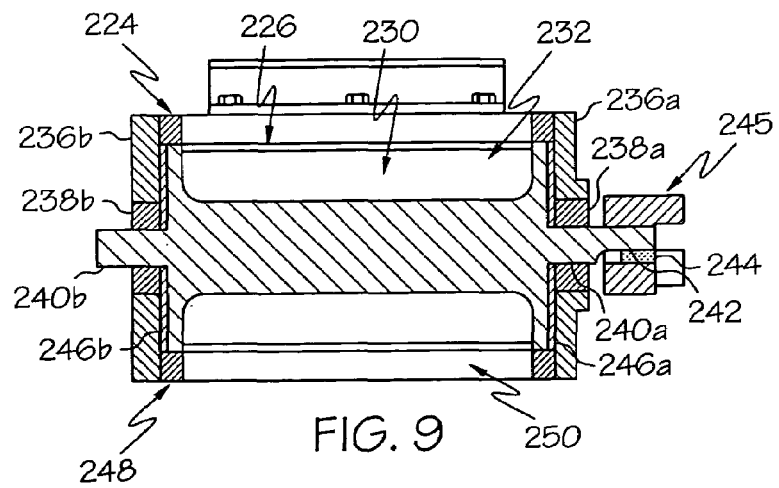

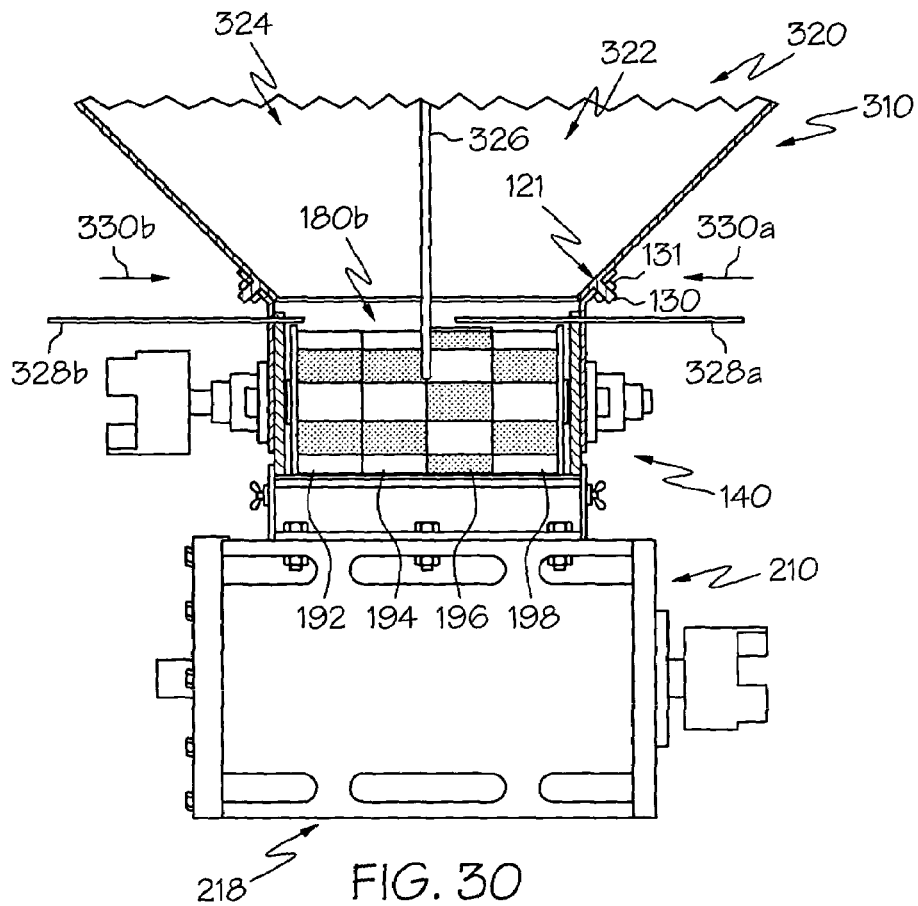
FIG. 30
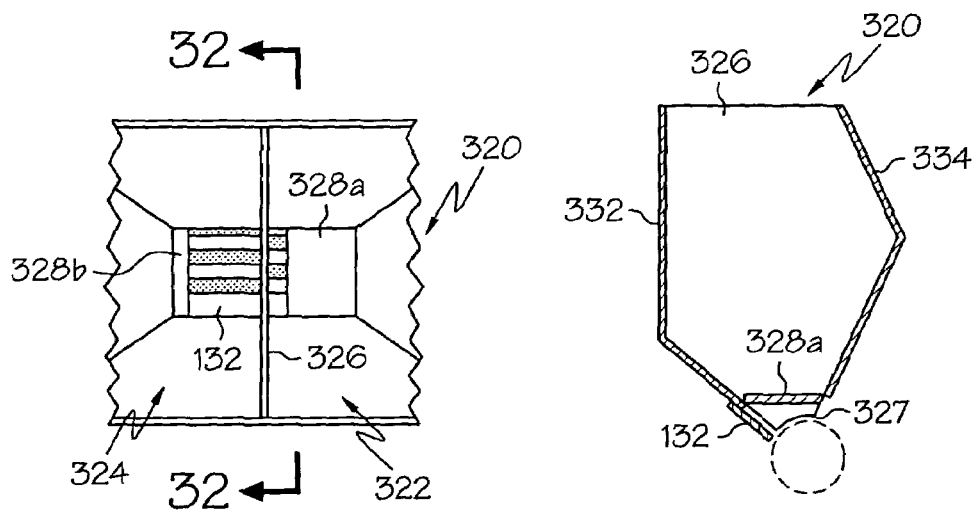
FIG. 31
FIG. 32

BULK MATERIAL DISCHARGE ASSEMBLY WITH FEEDING APPARATUS

CROSS-REFERENCES TO RELATED APPLICATIONS

This application claims the benefit of U.S. Provisional Application No. 60/364,543 filed Mar. 15, 2002, the entire disclosure which is herein incorporated by reference.

FIELD OF THE INVENTION

The present invention relates to bulk material discharge assemblies, feeding devices and feeding apparatus, for example, for metering additive into an airstream.

BACKGROUND OF THE INVENTION

Mobile blower systems distributing additive are known in the prior art. For example, U.S. Pat. No. 6,036,406 (the '406 patent) discloses a mobile blower system for planting grass seed. In accordance with the '406 patent, a trailer can be loaded with loose particulate that is introduced by a feeder to a mixing chamber. An air stream from ducting then forces loose particulate through a hose for discharging to the surrounding environment. The '406 patent further discloses a grass seed hopper with a rotary feeder for discharging grass seed (i.e., grass seed or a grass seed mixture) into the air stream. In use, the blower forces air through the ducting until a portion of the grass seed is mixed into the air stream by the rotary feeder associated with the grass seed hopper. A mixture of grass seed and air then encounter loose particulate added by a feeder to a mixing chamber. The loose particulate and grass seed are then carried by the air stream through the hose for distribution to the surrounding environment.

Trailers of the '406 patent may be useful in particular applications but may also have several disadvantages. The rotary feeder associated with the grass seed hopper may become clogged or otherwise inoperable at the job site; thereby requiring access to the rotary feeder. Moreover, the pressure differential between the grass seed hopper and the ducting can interfere with the discharge function of the rotary feeder. Conventional rotary feeders also typically include a single configuration and therefore may not accommodate a wide variety of additives and/or discharge characteristics. Still further, known additive hoppers may only store a single additive at a time, thereby requiring premixing of various additives prior to filling the additive hopper.

SUMMARY OF THE INVENTION

Accordingly, it is an object of the present invention to obviate problems and shortcomings of conventional bulk material discharge assemblies, additive hoppers, feeding devices and feeding apparatus.

To achieve the foregoing and other objects in accordance with the present invention, exemplary embodiments of the invention are directed to metering apparatus comprising an axle extending along an elongated axis. At least a length of the axle includes a cross sectional profile taken along a plane that is perpendicular to the elongated axis wherein the cross sectional profile includes a noncircular perimeter. The metering apparatus further includes first and second metering wheels. Each metering wheel includes a first side and a second side offset from the first side such that an overall width of the metering wheel is substantially disposed between the first and second sides. The first and second metering wheels further include a hub with a hub axis and a hub opening with a shape at least partially corresponding to the noncircular perimeter. Each metering wheel is mounted on the axle with each hub axis being collinear with the elongated axis of the axle, and wherein the noncircular perimeter and the shape of each hub opening cooperate to nonrotatably mount each metering wheel to the axle. The metering apparatus further includes a plurality of teeth extending away from the hub axis. Each wheel is provided with a plurality of cavities wherein each cavity is defined between two adjacent teeth and extends along a corresponding cavity axis to provide communication from the first side to the second side of the metering wheel. The first and second metering wheel are adapted to be selectively mounted in at least one of a first relative position with respect to one another wherein the cavity axis of at least one first wheel cavity is aligned with the cavity axis of at least one second wheel cavity, and a second relative position wherein the cavity axis of the at least one first wheel cavity is not aligned with the cavity axis of any second wheel cavity.

Additional exemplary embodiments of the invention are directed to a metering apparatus including an axle extending along an elongated axis. At least a length of the axle includes a cross sectional profile taken along a plane that is perpendicular to the elongated axis wherein the cross sectional profile includes a noncircular perimeter. The metering apparatus further includes first and second metering wheels. The first and second metering wheels comprise a first side and a second side offset from the first side. The metering wheels further include a hub with a hub axis and a hub opening with a shape that at least partially corresponds to the noncircular perimeter. Each metering wheel is mounted on the axle with each hub axis being collinear with the elongated axis of the axle, and wherein the noncircular perimeter and the shape of each hub opening cooperate to nonrotatably mount each metering wheel to the axle. The first and second metering wheels further include a plurality of teeth extending away from the hub axis. Each wheel is provided with a plurality of cavities wherein each cavity is defined between two adjacent teeth and extends along a corresponding cavity axis to provide communication from the first side to the second side of the metering wheel. The first and second metering wheel are adapted to be selectively mounted in at least one of a first relative position with respect to one another wherein the cavity axis of at least one first wheel cavity is aligned with the cavity axis of at least one second wheel cavity, and a second relative position wherein the cavity axis of the at least one first wheel cavity is not aligned with the cavity axis of the at least one second wheel cavity. In the first relative position, each cavity of the first metering wheel communicates with only one corresponding cavity of the second metering wheel.

In further exemplary embodiments, the invention is directed to a bulk material discharge assembly comprising a bulk material hopper, a conduit for delivering an air stream to entrain with bulk material from the bulk material hopper, and a feeding apparatus for introducing additive to the conduit. The feeding apparatus comprises an additive hopper and an airlock positioned adjacent the conduit. The airlock includes a rotor rotatably mounted within an interior chamber of the airlock. The airlock includes first and second openings that are substantially isolated from one another by the rotor, wherein the second opening is positioned adjacent the conduit. The feeding apparatus further includes a metering device in communication with the additive hopper for metering additive and introducing metered additive to the first opening of the airlock.

In still further exemplary embodiments, the invention is directed to an apparatus for dispensing additive comprising an additive hopper including at least one partition for dividing the additive hopper into at least two containment areas that are substantially isolated from one another and a metering device mounted to the additive hopper. The metering device comprises a metering apparatus including an axle extending along an elongated axis. At least a length of the axle includes a cross sectional profile taken along a plane that is perpendicular to the elongated axis wherein the cross sectional profile includes a noncircular perimeter. The metering apparatus further includes first and second metering wheels. Each metering wheel comprises a first side and a second side offset from the first side. Each metering wheel also includes a hub with a hub axis and a hub opening with a shape that at least partially corresponds to the noncircular perimeter. Each metering wheel is mounted on the axle with each hub axis being collinear with the elongated axis of the axle, and wherein the noncircular perimeter and the shape of each hub opening cooperate to nonrotatably mount each metering wheel to the axle. Each metering wheel further comprises a plurality of teeth extending away from the hub axis. Each wheel is provided with a plurality of cavities wherein each cavity is defined between two adjacent teeth and extends along a corresponding cavity axis to provide communication from the first side to the second side of the metering wheel. The first and second metering wheel are adapted to be selectively mounted in at least one of a first relative position with respect to one another wherein the cavity axis of at least one first wheel cavity is aligned with the cavity axis of at least one second wheel cavity, and a second relative position wherein the cavity axis of the at least one first wheel cavity is not aligned with the cavity axis of the at least one second wheel cavity. In the first relative position, each cavity of the first metering wheel communicates with only one corresponding cavity of the second metering wheel.

Exemplary assemblies, devices, apparatus and methods according to the invention will be more apparent in view of the following detailed description.

BRIEF DESCRIPTION OF THE DRAWINGS

The following detailed description will be more fully understood when viewed together with the drawings in which:

FIG. 6 is a front elevational view of an airlock apparatus and adapter angles of exemplary feeding apparatus;

FIG. 7 is a right side elevational view of the airlock apparatus and adapter angles of FIG. 6;

FIG. 8 is a top view of the airlock apparatus and adapter angles of FIG. 6;

FIG. 9 is a sectional view of the airlock apparatus and adapter angles of FIG. 6;

FIG. 30 is an exemplary embodiment of portions of a feeding apparatus with a divided hopper;

FIG. 31 is a top view of the feeding apparatus of FIG. 30;

FIG. 32 is a partial cross section of the feeding apparatus of FIG. 30;

DETAILED DESCRIPTION OF EXEMPLARY EMBODIMENTS

Figure 1:
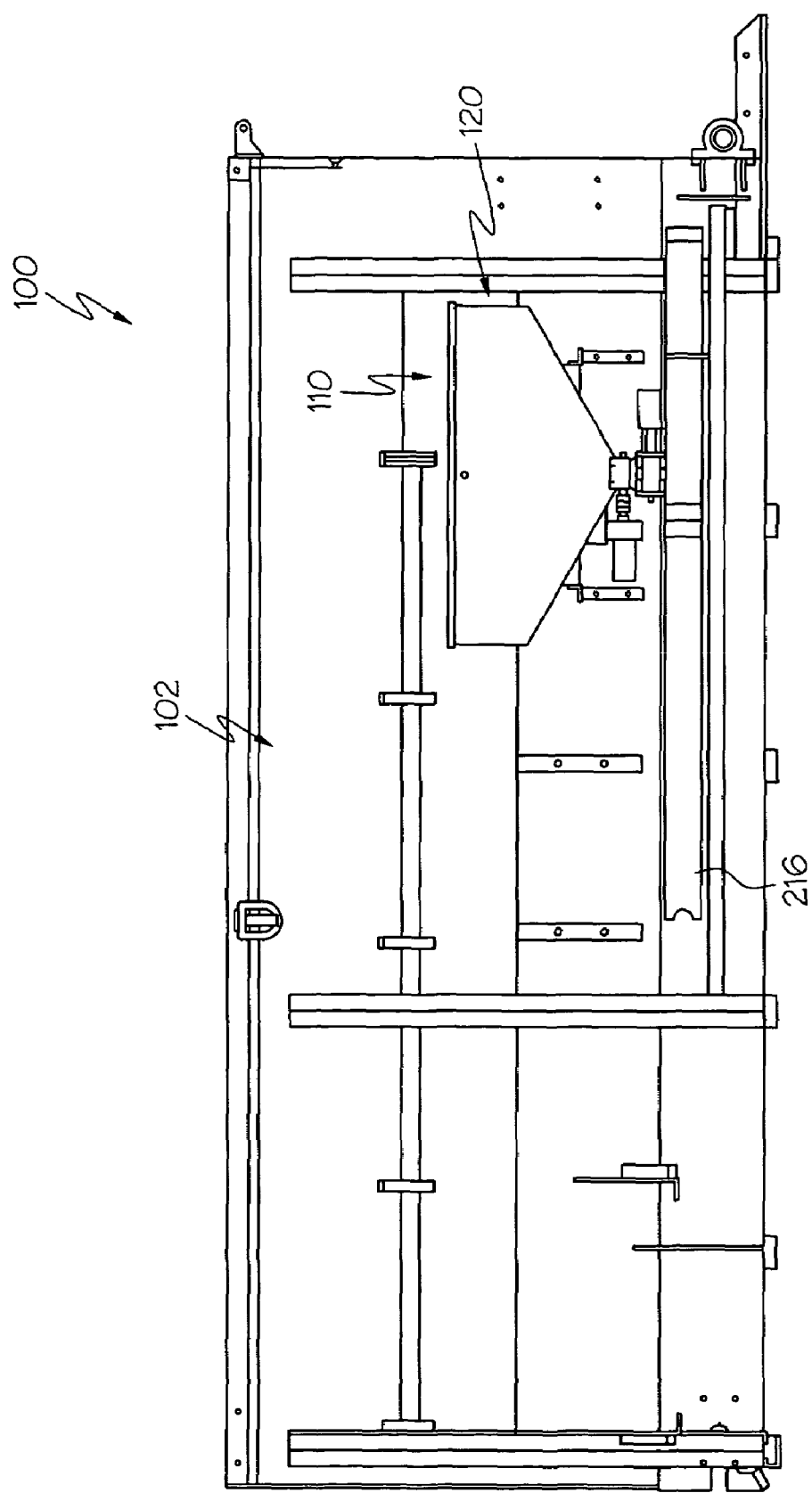
FIG. 1 is an elevational view of portions of a bulk material discharge assembly incorporating concepts of exemplary embodiments of the present invention.

FIG. 1 illustrates a bulk material discharge assembly 100 including a bulk material hopper 102 and a feeding apparatus 110. The bulk material discharge assembly can be similar to the assembly disclosed in U.S. patent application Ser. No. 09/578,782, Discharge Apparatus Adapted to Distribute Material filed May 25, 2000, the entire disclosure which is herein incorporated by reference. In addition, the bulk material discharge assembly may be powered by a hydraulic system similar to the system disclosed in U.S. Pat. No. 6,422,121 which issued on Jul. 23, 2002, which is herein entirely incorporated by reference.

The bulk material discharge assembly 100 includes a bulk material hopper 102 for storing bulk material which may comprise one or more of compost, chipped woods, chipped barks, mulches, seeds, grains, hays, fertilizers, sands, soils, herbicides, pesticides (e.g., insecticides), plastic pellets, salts or the like. As described in U.S. application Ser. No. 09/578,782, bulk material may be entrained into an airstream and thereafter forced through an outlet conduit to be distributed on a ground surface such as a landscaping terrain. "Entrained", throughout this application, is intended to mean mixing any material within another flowing material to form a heterogeneous and/or homogenous mixture.

The bulk material may also be mixed with other solids and/or liquids prior to, during, and/or after entraining with the flowing material. For instance, mulch may be treated with water, during and/or after entraining in order to prevent significant diffusing of mulch into the atmosphere, thereby more efficiently and effectively placing material on a surface in the desired distribution area. In one particular example, seed may be mixed with compost and/or fertilizer to encourage seedling growth. In one example, the bulk material may be mixed with solid/liquid herbicides and/or pesticides to deter weed growth and/or protect living organisms (e.g., plants). In one example, a feeding apparatus 110 may include a hopper 120 for additive. For example, additive may comprise seeds to entrain into an airstream with compost and/or hay to encourage seedling growth. Additive may also include fertilizers, sands, herbicides, pesticides, plastic pellets or the like. As disclosed herein, the feeding apparatus 110 may be a gravity fed feeding apparatus having a hopper 120. The hopper is positioned such that the additive is located at least substantially above the discharge opening of the hopper 120.

Figure 2:
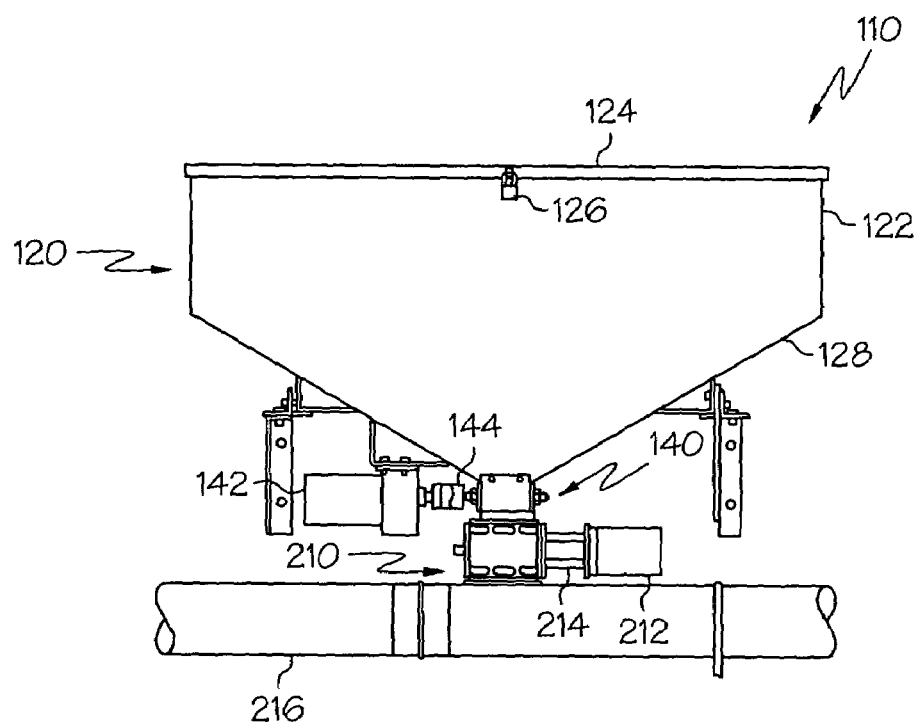
FIG. 2 is a front view of an exemplary feeding apparatus that is mounted to a conduit of a bulk material discharge assembly.
Figure 3:
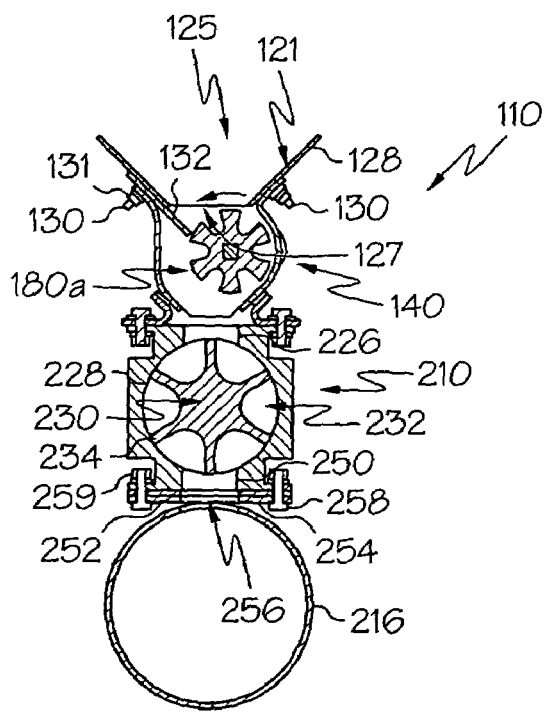
FIG. 3 is a sectional view of portions of an exemplary feeding apparatus that is mounted to a conduit of a bulk material discharge assembly.

As illustrated in FIG. 2, the feeding apparatus 110 includes a hopper 120 with an upper portion 122 having a lid 124 attached thereto for pivoting in an open or closed orientation. A latch 126 may be incorporated in order to maintain the lid 124 in a closed position with respect to the hopper 120. The hopper 120 further includes a funnel portion 128 for directing the additive towards the bottom of the hopper 120 for distribution. The funnel portion 128 has sloping sides to assist in the gravity feed to provide continuous availability of additive at the opening without bridging or tunneling effects within the additive. As shown in FIG. 3, the hopper 120 includes at least one containment area 125 including an opening 127.

The feeding apparatus 110 further includes a metering device 140 arranged relative to the hopper 120 such that the opening 127 of the containment area 125 is exposed to a metering apparatus of the metering device. In one example, the metering device is attached to the funnel portion 128 of the hopper 120. As shown in FIG. 30, for instance, bolts 130 may be provided that are integral or otherwise formed within the funnel portion 128 such that the head of the bolt is embedded within the side walls of the hopper 120 to provide a flat continuous interior surface 121 to facilitate additive flow into the metering device 140. Nuts 131 may then be tightened onto the bolts 130 in order to attach the metering device 140 to the hopper 120. Throughout the application, whenever a nut and bolt combination are used, it is understood that such combination may include washers such as lock washers in order to assist in fastening the elements together. As further illustrated in FIG. 2, the metering device 140 is powered by a metering device motor 142, for example, an electric motor. The metering device 140 may be provided with a coupling 144 to assist in rotating portions of the metering device 140 described below.

Figure 10:
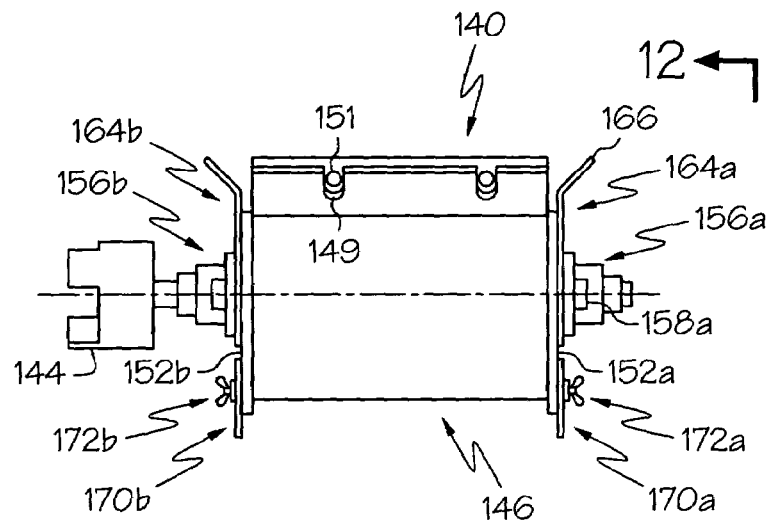
FIG. 10 is a front elevational view of a metering device of exemplary feeding apparatus.
Figure 11:
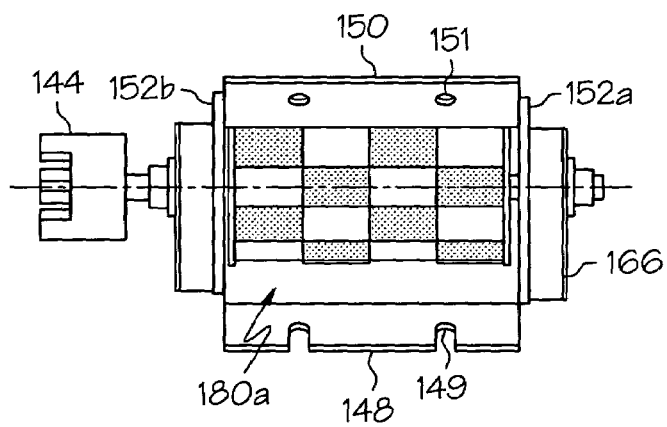
FIG. 11 is a top view of the metering device of FIG. 10.
Figure 12:
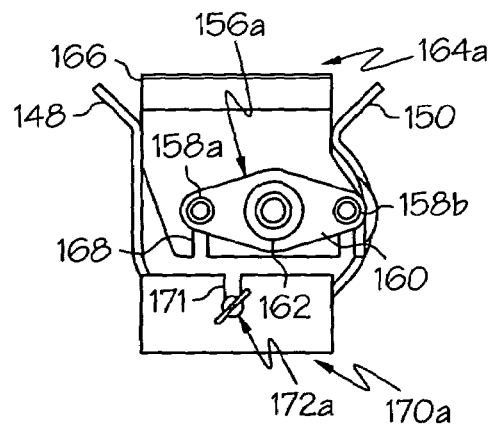
FIG. 12 is a right elevational view of the metering device of FIG. 10.

As more fully illustrated in FIGS. 10–12, the metering device 140 can include a housing 146 with a right housing side 152a and a left housing side 152b. The housing 146 further includes an upper front bent portion 148 (see FIGS. 11 and 12) with adjustment slots 149 and an upper rear bent portion 150 with mounting apertures 151. As illustrated more fully in FIGS. 10 and 12, the metering device 140 further includes a right bearing assembly 156a and a left bearing assembly 156b. The left and right bearing assemblies are identical in nature. Accordingly, detailed description of one bearing assembly equally applies to the other bearing assembly. For example, with reference to the right bearing assembly 156a, each bearing assembly includes a bearing plate 160 with a bearing hub 162 housing bearings for rotation of metering apparatus 180a. The bearing assembly 156a is attached to the right housing side 152a with nut and bolt combinations 158a and 158b. A right lower cover plate 170a includes a slot 171 to cooperate with a washer/wing nut assembly 172a to cover portions of the interface between the metering device 140 and an the airlock apparatus 210 described more fully below. Similarly, a left lower cover plate 170b is attached with a washer/wing nut assembly 172b to the left housing side 152b.

A metering device 140 further includes a right upper cover plate 164a including slots 168 for adjustably connecting the cover plate 164a to the right housing side 152a. The right upper cover plate 164a is attached with the nut and bolt combinations 158a, 158b. The right upper cover plate 164a further includes an upper angled portion 166 adapted to correspond to the angled sides of the funnel portion 128.

Figures 13, 14, 15:
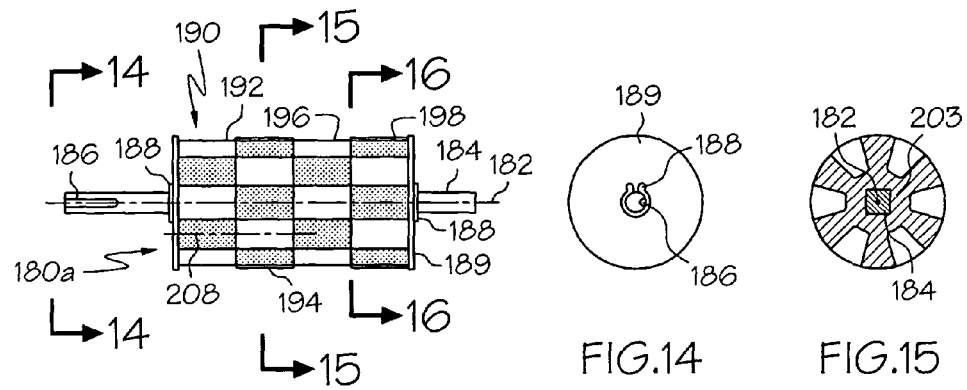
FIG. 13 is an exemplary metering apparatus in accordance with embodiments of the present invention.
FIG. 14 is a left elevational view of the metering apparatus taken along line 14—14 of FIG. 13.
FIG. 15 is a cross sectional view of the metering apparatus taken along line 15—15 of FIG. 13.

Exemplary metering apparatus (e.g., 180a–180j) are illustrated in the drawings and discussed herein. Exemplary metering apparatus can include an axle 184 extending along an elongated axis 182 and one or more metering wheels 190 for mounting on the axle 184. At least a length of the axle includes a cross sectional profile with a noncircular perimeter when the section is taken along a plane that is perpendicular to the elongated axis. For example, FIG. 15 is a sectional view taken along a plane that is perpendicular to the elongated axis 182. Although other shapes may be used, the noncircular perimeter can take a polygonal shape with three or more sides, such as a square shape as shown in the figures. The entire axle may have a noncircular perimeter or, as shown in the figures, a length of the axle includes the noncircular perimeter while other portions include a circular perimeter. For instance, as shown in the figures, only a middle length of the axle has a noncircular perimeter while the ends have a circular perimeter. The circular perimeter of the axle ends may be desired to facilitate rotation of the axle with respect to a housing of the metering device while the noncircular perimeter of the length of the middle portion may facilitate nonrotatable mounting of the metering wheels to the axle.

Exemplary metering apparatus may one or more metering wheels 190. For instance, exemplary metering apparatus can include a first metering wheel 192, a second metering wheel 194, a third metering wheel 196, and a fourth metering wheel 198. As illustrated in the figures, cavities of the metering wheels in FIGS. 13 and 18–26, 30, 31, 33–35 and 37 have been shaded for clarity. While the invention herein is described with respect to a metering apparatus including four metering wheels, any plurality of metering wheels, including two or more metering wheels may be provided in accordance with the present invention. Accordingly, the depiction of four metering wheels and the various embodiments and positions of the present invention is for illustrative purposes only and is not meant to limit the broad scope of the present invention.

Thrust plates 189 maintain the position of each of the metering wheels 190 with respect to the axle 184. In addition, a circlip 188 is received within a circumferential recessed groove (not shown) of the axle 184 to assist in maintaining each of the thrust plates 189 in position. The axle 184 further includes a key slot 186 for engagement with the coupling 144 to assist in rotating the axle 184.

Figures 16, 17, 18:
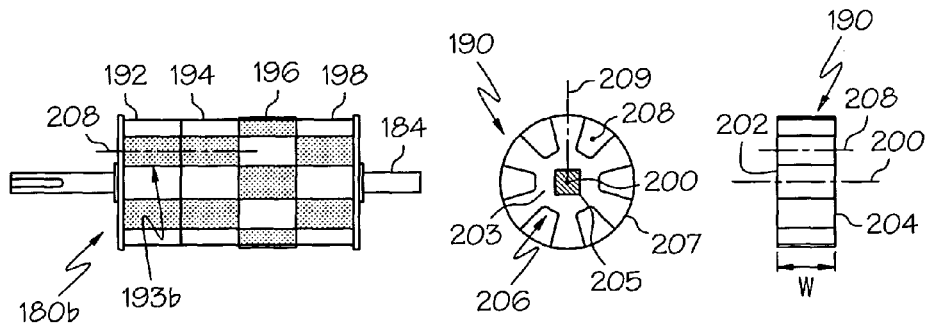
FIG. 16 is a cross sectional view of the metering apparatus taken along line 16—16 of FIG. 13.
FIG. 17 is a front elevational view of an exemplary metering wheel.
FIGS. 18–22 are various examples of the exemplary metering apparatus of FIG. 13 wherein the metering wheels are mounted in various positions with respect to one another.

As illustrated more fully in FIGS. 15–17, each metering wheel 190 includes a first side 202 and a second side 204 offset from the first side such that an overall width (W) of the metering wheel is substantially disposed between the first and second sides. Each metering wheel further includes a hub 203 with a hub axis 200. The metering wheels may be mounted on the axle 184 with each hub axis 200 being collinear with the elongated axis 182 of the axle 184. Each metering wheel further includes a plurality of teeth 207 extending away from the hub axis 200 along a tooth axis 209. In one example, the tooth axis 209 can be a symmetrical axis of the tooth and the metering wheel hub axis 200 can be a symmetrical axis of the metering wheel. Moreover, as best shown in FIG. 16, the symmetrical tooth axis 209 of each of the teeth can be arranged such that they are perpendicular to the symmetrical axis 200 of the hub 203. As further shown, the teeth of exemplary metering wheels can be radially disposed at equal distances about the hub axis 200 of the corresponding metering wheel. In embodiments wherein the hub axis 200 is a symmetrical axis of the metering wheel, the teeth may also be radially disposed at equal distances about the symmetrical axis of the corresponding metering wheel.

Each metering wheel is also provided with a plurality of cavities 206 defined between two adjacent teeth 207 and extending along a cavity axis 208 to provide communication from the first side 202 to the second side 204 of the metering wheel. In exemplary embodiments, the cavity axis 208 of each corresponding cavity 206 of the metering wheels are substantially parallel to the elongated axis 182 of the axle 184. As illustrated, the cavities 206 may be open-ended such that communication is provided at the corresponding first side 202 and second side 204 of the wheel 190. As best shown in FIG. 15, each metering wheel has a plurality of substantially identical cross-sectional profiles taken along a plurality of planes (i.e., wherein one cross-sectional profile along one exemplary plane is shown in FIG. 15) passing through the corresponding metering wheel that are perpendicular to the symmetrical axis 200 of the corresponding metering wheel. Moreover, the exemplary metering wheels illustrated herein can have substantially identical cross-sectional profiles taken along all planes passing through the corresponding metering wheel that are perpendicular to the symmetrical axis 200 of the corresponding metering wheel. Although not necessary, each metering wheel of the metering apparatus may be substantially identical to one another. For example, as illustrated in FIGS. 13 and 18–23, the first, second, third and fourth metering wheels 192, 194, 196 and 198 are substantially identical to one another with a configuration like the metering wheel 190 shown in FIG. 17.

As further illustrated in FIG. 16, each metering wheel 190 includes a hub opening 205 in the shape with a shape at least partially corresponding to the noncircular perimeter of the axle. The noncircular perimeter of the axle and the shape of each hub opening cooperate to nonrotatably mount each metering wheel to the axle as described herein. In one example, a set screw or other stop member, or configuration to accommodate the same, may provide an axle with a substantially noncircular perimeter. In further exemplary embodiments, each hub opening 205 and the noncircular perimeter of the axle 184 define a substantially identical polygonal shape with three or more sides. For instance, the polygonal shape of the can be a triangle, square, or other polygon. As illustrated in FIG. 15, portions of the axle 184 include a profile having a square perimeter. As further illustrated in FIG. 15, the hub opening 205 is shaped to correspond to the perimeter of the cross-sectional profile of the mounting portion of the axle 184 to assist in non-rotational mounting of the metering wheel 190 with respect to the axle 184.

In exemplary embodiments of the present invention, a relationship exists between the number of teeth 207 with respect to the number of sides of the polygonal shape of the hub opening 205 that corresponds to the polygonal cross-sectional profile of the axle 184. For example, as illustrated in FIGS. 15 and 16, the metering wheel 190 includes six teeth 207 that are equally spaced in a radial manner about a metering wheel axis of symmetry 200. In addition, the hub opening 205 has four equal sides in the shape of a square thereby providing a 6/4 ratio of teeth to polygonal sides. While exemplary embodiments herein depict the 6/4 ratio including six teeth and four polygonal sides, other numbers of teeth and polygonal sides may also be provided with the 6/4 ratio. For example providing metering wheels with twelve teeth and eight polygonal sides would still meet the 6/4 ratio of teeth to polygonal sides described above. Moreover, the 6/4 ratio is meant to be illustrative in nature only as other ratios of teeth to polygonal sides may be incorporated with the concepts of the present invention wherein at least a first and second metering wheel may be nonrotatably mounted on the axle in various relative positions with respect to one another.

Figure 26:
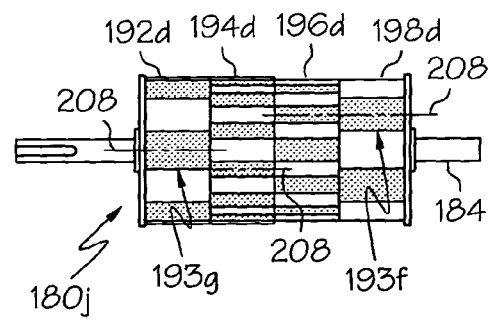
FIG. 26 is an exemplary embodiment of a metering apparatus wherein metering wheels have different numbers of teeth.

In exemplary embodiments, the ratio of teeth to polygonal sides may be selected to permit a first and second metering wheel to be selectively mounted in at least one of a first relative position and a second relative position with respect to one another. In one exemplary first relative position, the cavity axis 208 of at least one first wheel cavity is aligned with the cavity axis of at least one second wheel cavity. For example, as shown in FIG. 18, the cavity axis 208 of a cavity of the first wheel 192 is aligned with the cavity axis 208 of a cavity of the second wheel 194. In another example, as shown in FIG. 26, the cavity axis of the third metering wheel 196d is aligned with the cavity axis of the fourth metering wheel 198d.

In an exemplary second relative position, the cavity axis of the at least one first wheel cavity is not aligned with the cavity axis of any second wheel cavity. For example, as shown in FIG. 13, the cavity axis 208 of the first wheel cavity is not aligned with any cavity axis 208 of any cavity of the second wheel 194. In another example, as shown in FIG. 26, the cavity axis 208 of the cavity of the first wheel 192d is not aligned with any cavity axis 208 of any cavity of the second wheel 194d.

The metering wheels of the metering apparatus 180a (see FIG. 13) can be rearranged in various alternative relative positions with respect to one another to achieve different metering apparatus configurations as illustrated in FIGS. 18–22. For example, in FIG. 13, the metering wheels 190 are mounted such that the first metering wheel 192 have cavities that each extend along a corresponding cavity axis 208 and the third metering wheel 196 includes cavities that each extend along a corresponding cavity axis 208 that are aligned with the corresponding cavity axis 208 of the first metering wheel 192. Similarly, the second metering wheel 194 includes cavities that each extend along a corresponding cavity axes 208 that are aligned with the corresponding cavity axes 208 of the fourth metering wheel 198.

As shown by the metering apparatus 180a of FIG. 13, each of the cavities 206 of each metering wheel 190 is not aligned with any of the cavities 206 of any adjacent metering wheel such that the cavities 206 of each metering wheel are isolated relative to one another. To achieve such isolation, the corresponding open ends of the metering wheel 190 are blocked by corresponding teeth 207 of an adjacent metering wheel 190. Thus, as shown in FIG. 13 for example, the first metering wheel 192 is mounted on the axle with respect to the second metering wheel 194 such that each cavity 206 of the first metering wheel 192 is substantially prevented from communicating with any cavity of the second metering wheel 194.

As illustrated in FIG. 13, the metering wheels 192, 194, 196 and 198 may be selectively mounted such that the cavities 206 of each of the wheels 190 are substantially isolated from one another and radially arranged in a checkerboard-type fashion. Pulsating introduction of additive into the airlock may be minimized by increasing the rotational speed of the metering apparatus. Of course, increasing the rotational speed of the metering apparatus will correspond to an overall higher feeding rate of additive, resulting in a dense entrainment of additive into the air stream. This may be desirable, for example, when spreading seed in a dense application to landscaping terrain. However, in situations where a low density of additive is desired, the metering apparatus must be slowed down to reduce the additive density in the air stream. Slowing the metering apparatus, however, can result in pulsating introduction of additive into the air stream. Since pulsating introduction of additive can be a concern with low rotational velocities, a checkerboard-type arrangement for the metering wheel may be more desirable in order to provide a more continuous introduction of additive (e.g., seed such as grass seed, etc.) into an airlock described below for entraining into an air stream. An example of a lower density application would involve spreading of wildflowers wherein a lower density of seeds is desired for application to the landscaping terrain. Providing the metering apparatus with a checkerboard arrangement can be desirable to cause a more continuous feed of additive into the air stream, thereby reducing uneven spreading of additive to the landscaping terrain.

In other embodiments, larger volume cavities may be desired. Providing enlarged cavities may be desirable in instances where larger seeds are to be entrained into the airstream and therefore require an enlarged cavity to prevent chewing and therefore destruction of individual seeds by seeds that might partially be extending from the cavities, resulting in crushed or cut seeds as the metering apparatus rotates for dispensing its cavity contents. In addition, more or less teeth may be provided to increase or decrease the size of the individual cavities 206. However, overly increasing the size of the cavities 206 may undesirably increase the pulsing effect for smaller seeds. In addition, while smaller more numerous cavity sizes may be desirable to increase the continuity of seed distribution into the airstream, providing cavities that are undersized may result in destruction of seeds that are attempting to enter into the cavities to be distributed into the airstream.

FIG. 18 illustrates one alternative arrangement of metering wheels with respect to one another to define a metering apparatus 180*b* with enlarged cavities 193*b*. In particular, as illustrated in FIG. 18, the first metering wheel 192 and the second metering wheel 194 abut one another at a common boundary along an imaginary plane and have cavities that are aligned with one another such that the cavity axis 208 of the first metering wheel 192 extends along the axis 208 of the second metering wheel 194. Aligning the corresponding cavities and abutting the metering wheels at a common boundary along an imaginary plane permit communication between the cavities when they are aligned along their cavity axis 208. Such alignment effectively merges two cavities into one corresponding enlarged cavity 193*b* having twice the volume of each corresponding individual cavity. In embodiments where the metering wheels 190 are substantially identical with one another, all cavities of the first wheel are aligned with corresponding cavities of the second wheel to effectively merge the two corresponding cavities into corresponding enlarged cavities, each having twice the volume of the individual cavities.

The meeting apparatus 180*a* can be transformed into any of the orientations illustrated in any of FIGS. 18–22 by mere rearrangement of the metering wheels 192, 194, 196, 198 mounted thereon. For example, to transform the metering apparatus 180*a* to the metering apparatus 180*b*, rearrangement of the first metering wheel 192 is necessary.

As shown in FIG. 18, the first metering wheel 192 and the second metering wheel 194 are mounted in a first relative position with respect to one another wherein the cavity axis 208 of each cavity of the first metering wheel 192 communicates with only one corresponding cavity of the second metering wheel 194. As shown in FIG. 13, the first and second metering wheels may be alternatively mounted in a second relative position with respect to one another wherein each cavity of the first metering wheel 192 is not aligned with the cavity axis of any second wheel cavity such that each cavity of the first metering wheel 192 is substantially prevented from communicating with any cavity of the second metering wheel 194.

An exemplary process of transforming the metering apparatus 180*a* to the metering apparatus 180*b* will now be described. First, the left circlip 188 of the metering apparatus 180*a* is first removed. Next, the thrust plate 189 is removed. The thrust plate 189 has a square shaped opening (not shown) that permits nonrotational mounting of the plate 189 to the axle 184. The plate 189 is axially removed from the axle 184 to permit manipulation of the first metering wheel 192. Next, the first metering wheel 192 is moved to the left until its square-shaped hub opening 205 is disengaged from the squared cross-sectional portion of the axle 184. For example, the first metering wheel 192 may be axially offset such that the square-shaped hub opening 205 is located on the round circumferential portion at the left end of the axle to permit rotating the first metering wheel 192 with respect to the axle. Alternatively, the first metering wheel 192 may be completely removed from the axle 184. Next, the metering wheel 192 is rotated about its axis of symmetry 200 by 90°. Then, the metering wheel again axially inserted to the right such that the hub opening 205 of the metering wheel 192 again engages the square cross-sectional portion of the axle 184. As illustrated in FIG. 18, the cavities 206 of the first metering wheel 192 are aligned with the cavities 206 of the second metering wheel 194. Moreover, the metering apparatus 180*a* and 180*b* both include the first metering wheel 192 with a second side 204 that abuts the first side 202 of a second metering wheel 194 at a common boundary. For example, the common boundary may be an imaginary plane along the section 16—16 illustrated in FIG. 13. The new arrangement of the wheels 190 with respect to the metering apparatus 180b illustrated in FIG. 18, permits the combination of larger chambers and smaller chambers that may be desirable with different hopper arrangements as described more fully with respect to FIGS. 30–37 below.

In a similar fashion, the metering apparatus 180c (see FIG. 19) may also be formed by transforming the metering apparatus 180a. First and second metering wheels 192 and 194 of the metering apparatus 180a may be axially removed or displaced in a similar manner described above and rotated and reinserted such that the first, second and third metering wheels have cavities that are aligned with respect to one another along their axes 208. The three aligned cavities effectively provide an enlarged cavity 193c having three times the volume as the individual cavities 206.

Figures 19, 20:
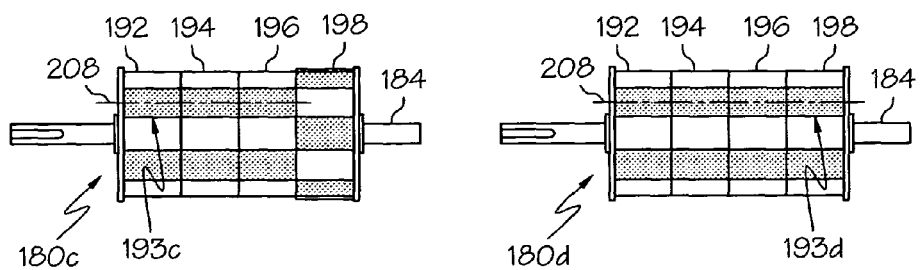

In addition, as shown in FIG. 20, the metering apparatus 180a may be transformed to the metering apparatus 180d by rearranging one or more of the metering wheels relative to one another such that all the cavities of each of the wheels 190 are aligned relative to one another along their cavity axes 208 to effectively provide an enlarged cavity 193d having four times the volume of their individual cavities 206.

Figure 21:
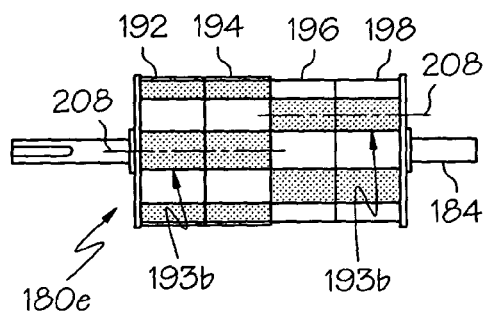

FIG. 21 illustrates still another embodiment of a metering apparatus 180e wherein the first metering wheel 192 and a second metering wheel 194 are positioned with respect to one another such that their cavity axes are aligned to define enlarged cavities 193b but are not aligned with respect to any of the cavities of the third metering wheel 196 or the fourth metering wheel 198. In addition, the cavities of the third and fourth metering wheels 196, 198, are aligned along their cavity axis 208 such that they form an additional enlarged cavities 193b.

In still a further embodiment, a metering apparatus 180f may be provided wherein the second and third metering wheel 194 and 196 have cavities that are aligned with respect to one another to define enlarged cavities 193b that are effectively twice the size of cavities in the individual metering wheels 190. However, the cavity axis of the second and third metering wheel are not aligned with the cavity axis of either the first metering wheel 192, or the fourth metering wheel 198. In addition, the first cavity axis 208 of the first metering wheel are aligned with the cavity axis 208 of the fourth metering wheel but are not in communication with one another and therefore do not define an enlarged cavity. In the exemplary embodiment of FIG. 22, the cavities of the first and fourth metering wheels 192, 198 are separated by corresponding teeth 207 of the second and third metering wheels 194, 196.

Figure 22:
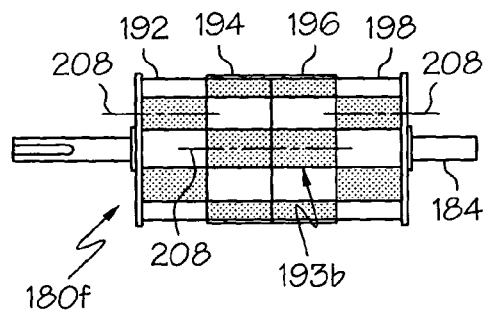
Figure 23:
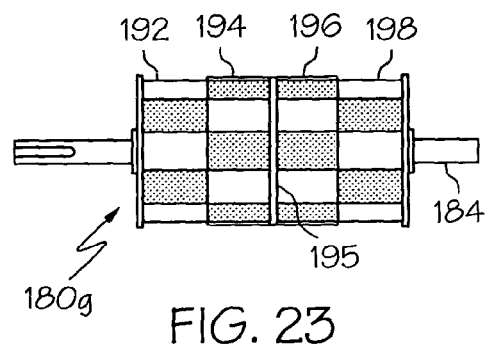
FIG. 23 is an exemplary metering apparatus with a boundary plate.

FIG. 23 illustrates a metering apparatus 180g arrangement similar to FIG. 22 except that the boundary comprises a boundary plate 195 arranged such that the first side of the first metering wheel 196 abuts the second side of the second metering wheel 194. Unlike an imaginary plane, a boundary plate prevents communication between cavities. Thus, even when the cavity axes are aligned, the boundary plate prevents formation of enlarged cavities.

Figure 24:
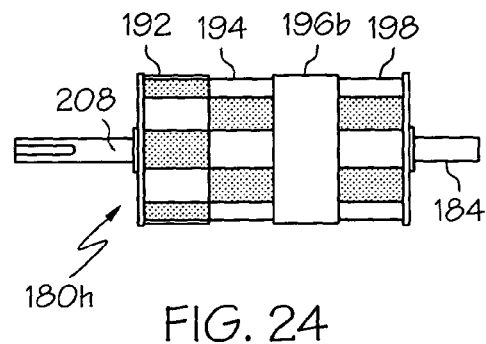
FIG. 24 is an exemplary metering apparatus with a blank wheel.

Still further, FIG. 24 illustrates a metering apparatus 180h similar to the metering apparatus 180a except that the third metering wheel is removed and replaced with a blank wheel 196b such that the second and fourth metering wheels abut a common boundary comprising the blank wheel 196b. Like the boundary plate, the blank wheel 196b prevents communication between aligned cavities of adjacent metering wheels. Moreover, due to the substantial overall width of the blank wheel, the capacity of the metering apparatus may be substantially varied. One or more of the metering wheels may be replaced with blank wheels to limit the metering rate. For example, per revolution, the metering apparatus 180h has ¾ the metering capacity of the metering apparatus 180a.

Figure 25:
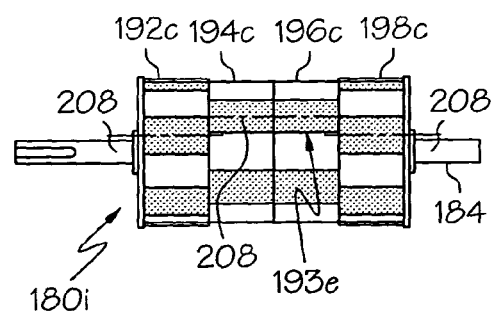
FIG. 25 is an exemplary embodiment of a metering apparatus that have cavities that are at least partially in communication with one another.

FIG. 25 illustrates an alternative embodiment of a metering apparatus 180i wherein the ratio of teeth to the number of polygonal sides and/or the relationship between the teeth and hub opening of the axle 184 may permit selective misalignment of one or more of the wheels with respect to one another with their cavities at least partially being in communication with one another. For example, as illustrated in FIG. 25, the second and third metering wheels may be 194c and 196c may be aligned such that the cavity axis 208 of the second metering wheel 194c is aligned with the cavity axis 208 of the third metering wheel 196c to assist in creating an enlarged cavity 193e. In addition, the first metering wheel 192c includes cavities with a cavity axis 208 that is not coaxial with the axis of the cavities of the second and third metering wheels. In addition, although not necessarily required, the cavity axis 208 of the first metering wheel 192c may be aligned with the cavity axis 208 of the fourth metering wheel 198c. As illustrated in FIG. 25, all of the cavities of the first metering wheel 192c and fourth metering wheel 198c are at least partially in communication with the corresponding cavities of the second and third metering wheels 194, 196. Accordingly, an enlarged cavity 193e may have a cavity with four times the effective cavity volume as each individual cavity 206. In addition, the aligned cavities of the second and third cavity wheels provide an unobstructed communication therebetween to provide an effectively larger area while the cavities of the first and fourth metering wheels are partially obstructed and therefore somewhat restricted in their communication with the cavities of the second and third metering wheels.

In still a further embodiment, a metering apparatus 180j is provided wherein the second metering wheel 194d and the third metering wheel 196d have an increased number of teeth 207 thereby reducing the overall size of the cavity 206 therebetween. In addition, as illustrated in FIG. 26, at least certain cavities of the third metering wheel 196d have a cavity axis 208 aligned with the cavity axis of a corresponding cavity in the fourth metering wheel 198d to provide an enlarged cavity 193f. In addition, the second metering wheel 194d has cavities wherein at least some of the cavities have a cavity axis 208 that is not aligned with the cavity axis 208 of the first metering wheel but still permits fluid communication between portions of some of the cavities to create an enlarged cavity 193g. In fact, each cavity of the first metering wheel 192d communicates with two cavities of the second metering wheel 194d while each cavity of the fourth metering wheel 198d communicates with only one corresponding cavity of the third metering wheel 196d.

Turning back to FIG. 2, the bulk material discharge assembly 100 further includes an airlock apparatus 210 connected to a conduit 216. The conduit 216 is provided for delivering an air stream to entrain with bulk material from the bulk material hopper 102. The airlock apparatus 210 is provided to assist in isolating the additive hopper 120 from pressure surges from the conduit 216. A motor 212, such as a hydraulic motor, is designed to rotate the rotor of the airlock. A cage 214 assists in connecting the coupling between the motor and airlock. As illustrated in more detail in FIG. 3, the airlock apparatus 210 is mounted to a mounting plate 254 attached to the conduit 216 with a bolt 258 and nut 259. A gasket 252 may be provided between the mounting plate 254 and the airlock apparatus 210 to prevent fluid leakage therebetween. Accordingly, once the airlock apparatus 210 is mounted to the conduit 216, an opening 256 of the conduit 216 is in fluid communication with a bottom opening 250 of the airlock apparatus 210. As the air contained within the conduit 216 is fluid with a greater than atmospheric pressure, the airlock apparatus 210 may be provided to reduce fluid and pressure release while also assisting to introduce additive for entraining into the fluid stream. Turning to FIGS. 6–9, the airlock apparatus 210 includes a housing 218 with cavities 220 therein. The housing 218 includes an upper mounting surface 224 and a bottom mounting surface 248. A top opening 226 extends through the upper mounting surface 24 and into an interior chamber of the housing 218. In addition, the bottom mounting surface 248 includes a bottom opening 250 extending therethrough that is also in communication with the interior chamber of the housing 218. A rotor 230 is mounted within the interior chamber of the housing 218 to substantially isolate the top opening 226 from the bottom opening 250. The rotor 230 is mounted with a right bearing plate assembly 236a and a left bearing plate assembly 236b. The right mounting bearing plate assembly 236a includes a right bearing 238a for receiving a right spindle 240a of the rotor 230 while the left bearing plate assembly 236b includes a left bearing 238b for receiving a left spindle 240b. At least one of the bearing plate assemblies may be removably attached to the housing 218, for example, with screws 237, to provide access to the interior of the housing. Bushings 246a, 246b, such as lubricant impregnated bronze bushings, may be provided to reduce friction between the rotor and the bearing plate assemblies. The right spindle 240a includes a key slot 242 to permit a coupling 245 to be nonrotatably attached with a key 244 to the right spindle 240a. As best illustrated in FIG. 3, the rotor 230 is positioned within the interior chamber 228 of the housing 218 and includes six rotor teeth 234 equally spaced about a rotary central axis of symmetry wherein cavities 232 are defined between adjacent rotor teeth 234.

Figure 27:
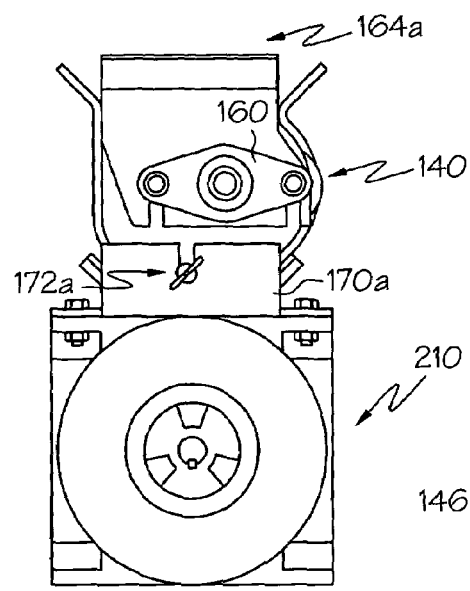
FIG. 27 is a right side elevational view of a metering device and airlock apparatus in accordance with exemplary embodiments of the present invention.
Figure 29:
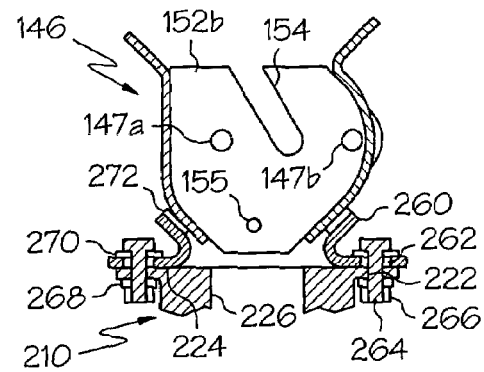
FIG. 29 is a partial sectional view of portions of a metering device and airlock apparatus in accordance with exemplary embodiments of the present invention.
Figure 28:
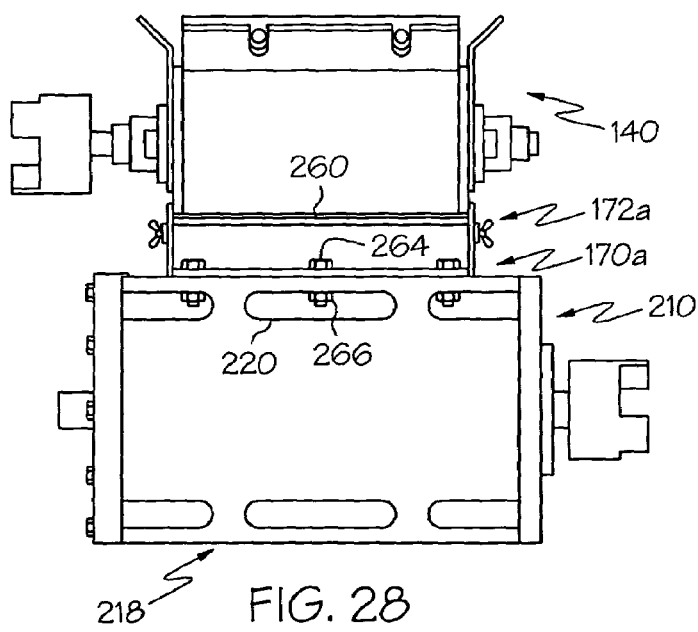
FIG. 28 is a front elevational view of the metering device and airlock apparatus of FIG. 27.

FIGS. 27–29 illustrate an exemplary positional relationship between the metering device 140 and the airlock apparatus 210. The mounting arrangement of the airlock apparatus 210 with respect to the metering device 140 is illustrated in detail in FIGS. 27–29. For example, as illustrated in FIG. 29, the airlock apparatus includes adapter angles 260 that are mounted to the mounting surface 224. Each adapter angle includes adjustment slots 262 to permit adjustment of the position of the adapter angle 260 with respect to the airlock housing 218. To mount the adapter angles 260 to the airlock housing 218, a washer 270 is placed over the slot 262 then the bolt 264 is inserted through the slot and locked with a nut 266 and lock washer 268. A seal strip 272, such as a foam seal strip, may be adhered to either the housing 146 or the upper portion of the adapter angle 260. For example, as illustrated in FIG. 29, the seal strip 272 is adhered, for example, with an adhesive, to the inner side of the upper portion of the adapter angles 260. The seal strip 272 assists in preventing leakage of additive material as it is traveling from the metering device 140 to the airlock apparatus 210.

As illustrated in FIG. 28, the housing 218 of the airlock apparatus 210 includes cavities 220 to permit access to the nut 226 for tightening the bolt 264. As further illustrated in FIG. 27, the right lower cover plate 170a (and the left lower cover plate 170b that is not shown) may be adjusted such that end openings between the airlock apparatus 210 and metering device 140 are at least substantially covered by the cover plates 170a, 170b in order to reduce leakage of additive as it travels from the metering device 140 to the airlock apparatus 210. As further illustrated in FIG. 29, for clarity, the metering apparatus 180a has been removed to illustrate an exemplary aperture and slot pattern arrangement on the left housing side 152b. While these aperture and slot arrangement as shown with respect to the left side 152b, it is understood that such arrangement is also found on the right housing side 152a. When mounting the metering apparatus 180a within the housing 146, the ends of the axle 184 travel along the axle receiving slot 154 until at rest at the bottom or at the lowermost portion of the slot 154. Next, the corresponding ends of the axle 184 are inserted through elongated apertures (not shown) of the upper cover plates 164a, 164b as the cover plates are pushed up against the corresponding housing side 152a, 152b. Next, the corresponding bearing assemblies 156a, 156b are mounted with respect to the axle 184 such that the metering apparatus 180a is rotatably mounted with respect to the housing 164.

The nut and bolt combination 158a, 158b are initially loosely tightened. The upper cover plates 164a, 164b may be then adjusted vertically such that the bolts of the nut and bolt assemblies 158a, 158b travel within the slots 168 to allow the upper angled portion 166 of the upper cover plates to abut up against the angled walls of the funnel portions 128 of the hopper 120. Next, the nuts of the nut and bolt assemblies 158a, 158b are tightened to secure the upper cover plates 164a, 164b with respect to the housing 146. Also, as illustrated in FIG. 29, the right and left housing sides include apertures 147a, 147b, to receive the bolts of the nut and bolt combinations 158a, 158b. In addition, each housing side includes an additional aperture 155 for receiving the washer/wing nut assembly 172a, 172b.

Figure 4:
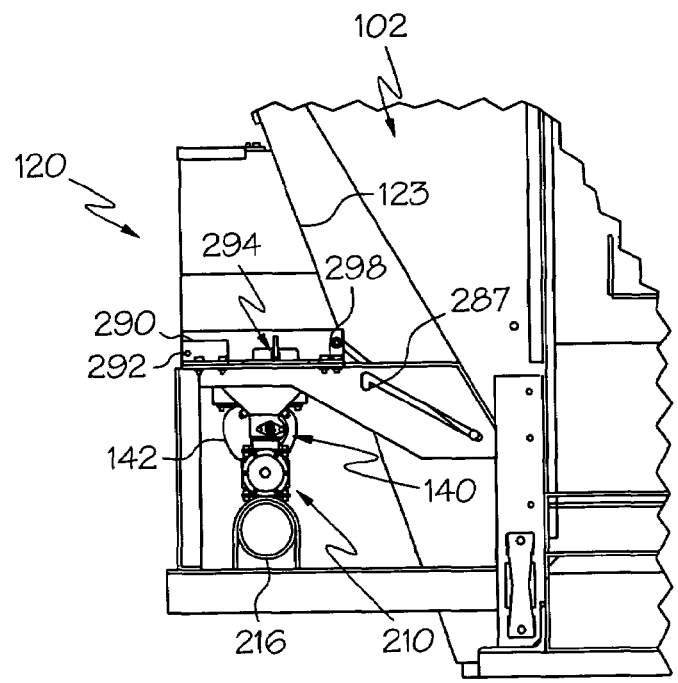
FIG. 4 illustrates portions of a bulk material discharge assembly wherein the hopper and metering device are in an operating position with respect to the airlock apparatus.
Figure 5:
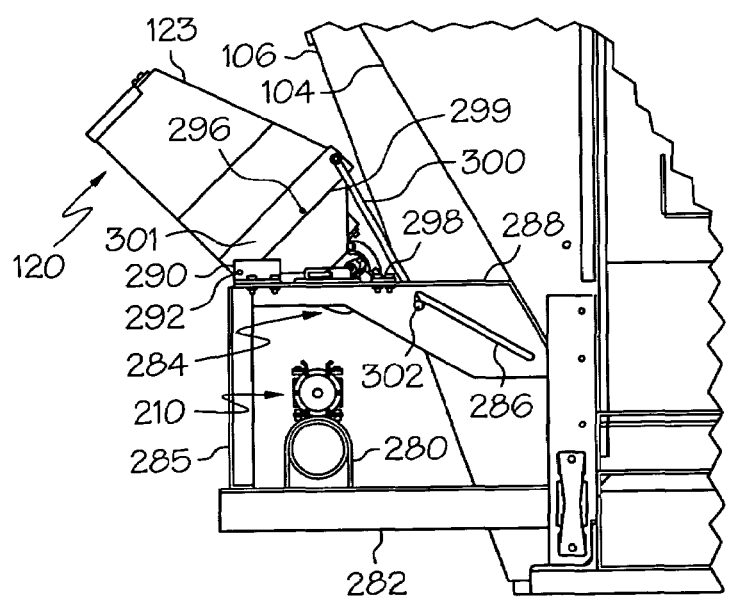
FIG. 5 illustrates portions of a bulk material discharge assembly wherein the hopper and metering device are positioned relative to the airlock apparatus to provide access to portions of the feeding apparatus.

FIGS. 4 and 5 illustrate the mounting arrangement of the hopper 120 for additive, the metering device 140, the airlock apparatus 210, and the conduit 216 with respect to the bulk material hopper 102. As illustrated in FIG. 5, a mounting platform 282 extends from the side of the bulk material discharge assembly 100 to provide support for the conduit 216 and the airlock apparatus 210. A conduit mounting bracket assembly 280 mounts and positions the conduit 216 with respect to the mounting platform 282. In addition, portions of the bulk material discharge assembly (e.g., lateral bracket assembly 284) may further extend from a side of the bulk material discharge assembly 100 to provide support for the hopper 120 with metering device 140 attached thereto. An angle brace 285 provides additional support for structural integrity for the lateral bracket 284 while only one lateral bracket assembly 284 is illustrated in FIG. 5, it is understood that an identical bracket assembly is mounted on the other side of the hopper 120 as illustrated in FIGS. 1 and 2. The lateral bracket assembly includes the mounting flange 288 with a support plate 298 and a pivot angle bracket 290 bolted thereto.

As illustrated in FIG. 4, support for the hopper 120 is provided by the pivot angle bracket 290 which is pivotably connected at a pivot point 292 and also a support plate 298 which extends outwardly for engagement with the underside surface 299 of an outwardly extending ledge 301. A latching mechanism 294 is also mounted on the mounting flange 288 to permit engagement with a latching aperture 296 provided in the hopper 120. Accordingly, the latching mechanism 294 will permit the hopper 120 to be locked in position relative to the bracket assembly 284.

As illustrated in FIG. 5, the hopper 120 may be pivoted about pivot point 292 to allow access to the airlock apparatus 210 to dislodge any obstructions or to otherwise clean the metering device 140 and/or the airlock apparatus 210. Therefore, the hopper 120 may be pivotably mounted to the lateral bracket assembly 284 such that the metering device 140 may be moved away from the airlock by pivoting the hopper 120 relative to the lateral bracket assembly 284. A limiting link 300 is pivotably connected to the hopper 120 to limit the extend of the pivoting movement of the hopper 120 with respect to the lateral bracket assembly 284. As illustrated in FIG. 5, a follower 302 travels within slot 286 as the hopper 120 pivots into position as illustrated in FIG. 5. In addition, a stop notch 287 is provided at the upper end of the slot 286 in order to lock the hopper 120 in position as illustrated in FIG. 5. In order to unlock the hopper, the follower 302 must be positioned back within the linear slot 286. Accordingly, as illustrated in FIG. 4, the angled rear wall 123 may be flush with an outer hopper surface 106 of the bulk material hopper 102. In addition, in exemplary embodiments, the lateral bracket assembly 284 may be attached to a recessed hopper surface 104 of the bulk material hopper 102.

The hopper for additive 120 described with reference to FIGS. 1–29 above include a single, undivided containment area wherein a single load of material may be stored within the hopper 120 in a single containment area arrangement. In use, with respect to FIG. 3, the hopper 120 is filled with additive. Next, a blower is activated to cause air to travel at a high velocity through the conduit 216. The airlock hydraulic motor 212 is then activated to cause the rotor 230 to begin spinning (in either a clockwise or counterclockwise direction). The metering motor 142 is then activated to cause the metering apparatus 180a to begin rotating towards a rub plate 132. The rub plate 132 may be made from high molecular weight polyethylene or other material. In one example, the rub plate 132 may be attached to the hopper 120 with the nut and bolt arrangement 130, 131. The bolts 130 may extend through corresponding slots (not shown) in the rub plate 132 to permit adjustment of the rub plate 132 to a close proximity without interference with the rotation of the metering wheel apparatus 180a. The metering motor 142 rotates the metering apparatus 180a toward the rub plate 132 (i.e., in the counter clockwise direction as illustrated by the directional arrow in FIG. 3). Additive then falls within the cavities 206 and is then dropped through the top opening 226 of the airlock apparatus 210. The additive then falls into the cavities 232 of the rotor 230 to be rotated (in either a counterclockwise or clockwise direction) to drop the additive through the openings 250, 256 to be entrained into the air stream flowing through the conduit 216. The airlock rotor 230 will always be spinning fast enough to accommodate the additive volume passing through the metering device 140. In fact, frequently the metering apparatus 180a will rotate relatively slow with respect to the airlock rotor 230 as the metering apparatus provides a metered dispensing of additive to be entrained into the air stream. The airlock also provides the added benefit of preventing undesirable back pressure surges of air through the metering apparatus and upward into the hopper that would otherwise exist if the metering apparatus were directly connected to the conduit 216. That is, the airlock assists in isolating the hopper from air pressure surges up through the metering apparatus that would potentially interfere with the metering process.

While the inventive concepts of the present invention may be used with an undivided hopper, other embodiments of the present invention incorporate a divided hopper arrangement. FIGS. 30–32 illustrate one exemplary embodiment of a feeding apparatus 310 with a divided hopper 320 for additive including a first containment area 322 and a second containment area 324 that are substantially isolated from one another by a non-moveable divider 326. For example, the divider 326 may be formed integrally with the front wall 332 and the rear wall 334 as illustrated in FIG. 32. FIG. 30 illustrates a partial cross-sectional view of a feeding apparatus 310 with a divided hopper 320 incorporated therein. In fact, the divider 326 allocates the metering function of any additive contained in the first containment area 322 to the third and fourth metering wheels 196, 198. In addition, the divider 326 further allocates metering of any additive contained in the second containment area 324 to the first and second metering wheels 192, 194 of the metering apparatus 180b. Accordingly, various configurations illustrated in the exemplary embodiments of FIGS. 13 and 18–26 may be incorporated within the metering device 140 depending upon the characteristics of the additives contained in each of the first containment area 322 and the second containment area 324 of the hopper 320. As illustrated, the first and second metering wheels 192, 194 comprise aligned cavities while the third and fourth metering wheels 196, 198 comprise a checkerboard arrangement of cavities as described with respect to FIG. 18 above. This arrangement may be particularly useful when larger seed or additive is contained in the second containment area 324 and being metered by the first and second wheels 192, 194 of the metering apparatus 180b, while smaller seed or additive contained in the first containment area 322 is metered by the third and fourth metering wheels 196, 198. In addition, each of the embodiments of the present invention may include one or more blocking members 328a and/or 328b adapted to assist in adjusting the size of the opening. The blocking members may be used in order to adjust the rate of additive being metered by the metering device 140 and/or to change the percent allocation of the additive with respect to the first and second containment areas 322, 324. For example, as illustrated in FIG. 30, the right blocking member 328a may be inserted toward the divider 326, in the direction of arrow 330a, to reduce the size of the opening of the first containment area, thereby reducing the amount of additive being metered from the first containment area 322. Similarly, the left blocking member 328b may be inserted toward the divider 326, in the direction of arrow 330b, to limit the amount of additive being metered from the second containment area 324. In one example, as illustrated in FIG. 30, the right blocking member 328a is moved closer to the divider 326 than the left blocking member 328b, thereby controlling the relative size of the containment area openings with respect to one another to control the relative percentage of additive being metered from each containment area.

As illustrated in FIG. 32, the divider 326 may include an arcuate portion 327 to closely conform to the outer circumference of the metering apparatus 180b thereby minimizing leakage of material to an undesired metering location. While the divider of FIG. 30 is illustrated as being centrally located within the hopper, it is understood that the divider 326 could be offset closer to one side relative to the other in applications where a larger amount of material is needed to be entrained into the airstream. In one example, for instance, a grass seed might be combined with a granular fertilizer wherein a larger portion of seed is necessary in order to prevent over-fertilization and/or burnout of the seedlings. In addition, the checkerboard arrangement of cavities as illustrated and described throughout this disclosure may be particularly useful in instances wherein the metering device 140 is metering at a relatively slow rate such that the metering apparatus rotates slowly. Thus, the checkerboard fashion will thereby minimize pulsing of introduction of seeds as the seeds are dispensed in a more continuous manner than in arrangements wherein all cavities are aligned along a common cavity axis.

Figure 33:
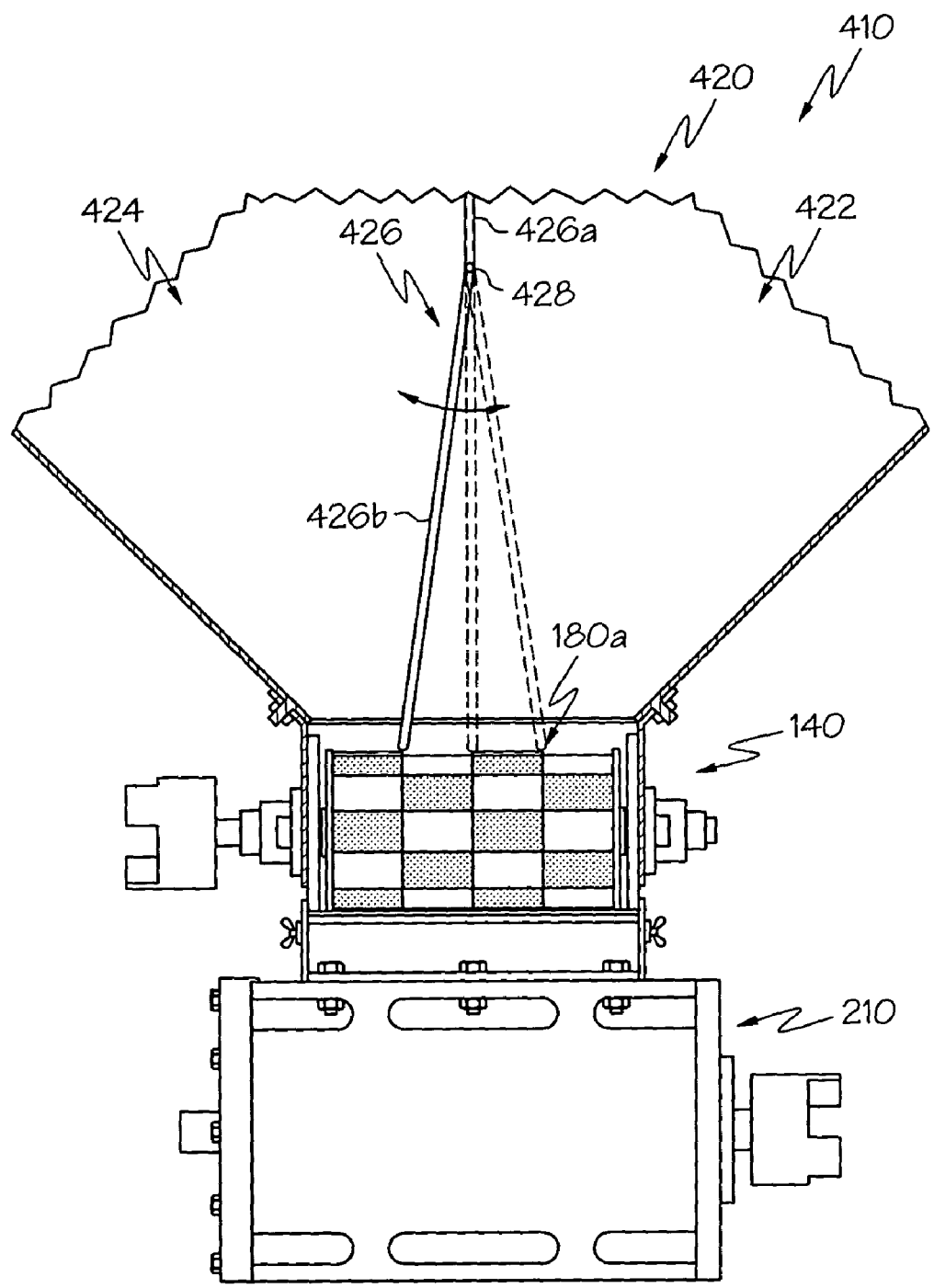
FIG. 33 is another exemplary embodiment of portions of a feeding apparatus with a divided hopper.

FIG. 33 illustrates still another embodiment of a feeding apparatus 410 with a hopper 420 that is divided with a first containment area 422 and a second containment area 424 by an adjustable divider 426. The divider 426 includes an upper divider 426a and a swinging lower divider 426b. The lower divider 426b is pivotably connected to the upper divider 426a with a hinge 428 permitting swinging of the lower divider 426b to change the percent allocation of additive between the first containment area 422 and the second containment area 424 of the hopper 420. Moreover, as shown in FIG. 33, the adjustable divider can be positioned such that the second containment area opening is substantially exposed to the first metering wheel while the second containment area opening is substantially exposed to the second, third and fourth metering wheels. In order to minimize the gap between the end of the swing lower divider 426b and the metering apparatus 180a, the length of the swing arm 426b can be substantially long to permit a relatively low swing angle to span the length of the metering apparatus 180a. In one example, although not shown, the divider 426 comprises a single swinging arm 426b without the upper divider 426a. Although not shown, means will be provided to lock or otherwise position the lower swing arm 426b to define the right area 422 and left area 424. The adjustable divider may be moved such that the first and second containment area openings are substantially exposed to different combinations of metering wheels. In some applications, the divider may be adjusted such that all of the metering wheels are only exposed to one containment area opening. Moreover, different metering apparatus arrangements (e.g., see FIGS. 13 and 18–26) may be used depending on the particular application. Therefore, feeding apparatus in accordance with exemplary embodiments may be convertible to various alternative configurations.

Figure 34:
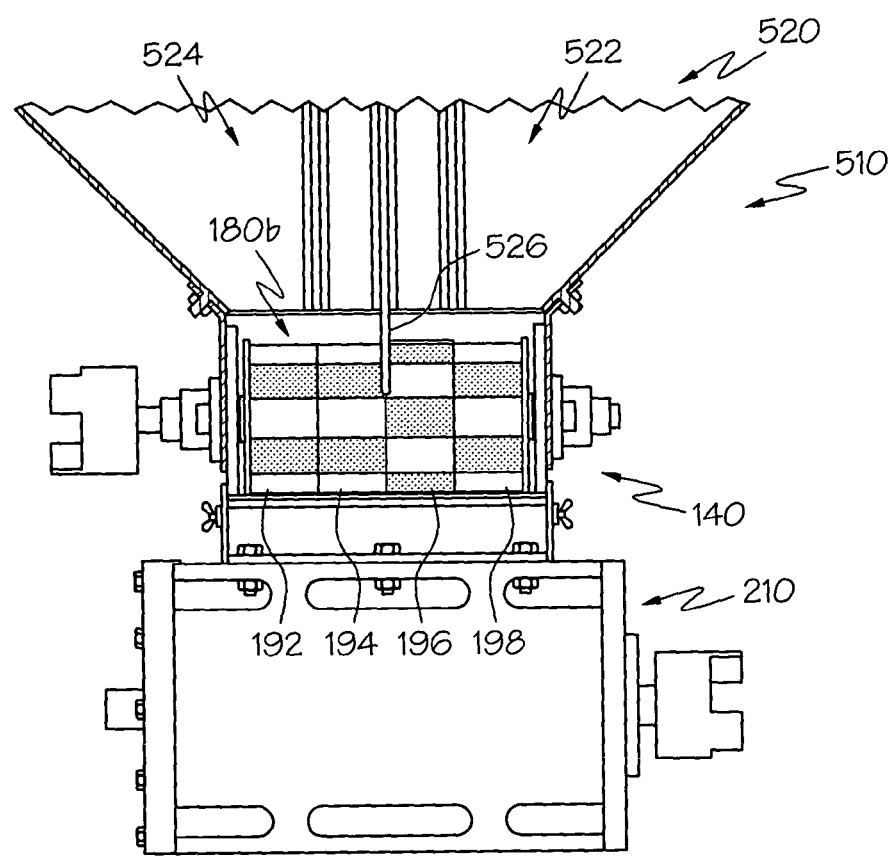
FIG. 34 is still another exemplary embodiment of portions of a feeding apparatus with a divided hopper.
Figure 35:
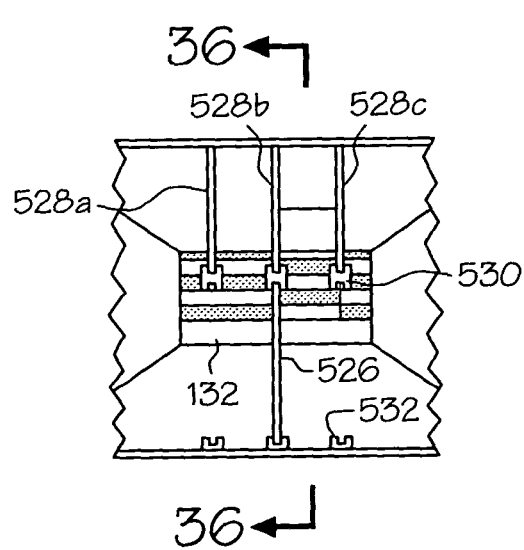
FIG. 35 is a top view of the feeding apparatus of FIG. 34.
Figure 36:
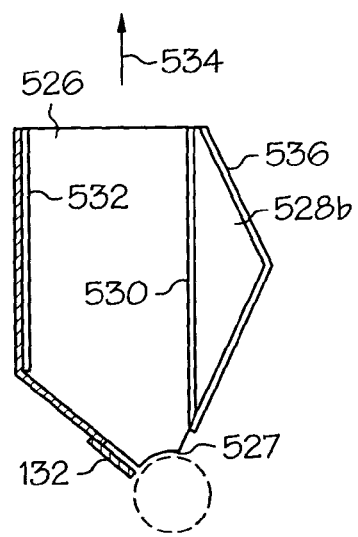
FIG. 36 is a partial cross section of the feeding apparatus of FIG. 34.

FIGS. 34–36 illustrate yet another embodiment of a feeding apparatus 510 including a hopper 520 for additive. The hopper 520 includes an adjustable divider 526 to separate the interior area of the hopper into a first containment area 522 and a second containment area 524. In the position shown in FIG. 34, the hopper is divided into two equal areas similar to the structure shown in FIG. 30. However, unlike FIG. 30, the adjustable divider 526 may be lifted vertically along directional arrow 534 illustrated in FIG. 36 to change the position of the divider to thereby redefine the areas 522, 524. As best illustrated in FIGS. 35 and 36, the hopper 520 may include non-removable dividers 528a, 528b, 528c, with corresponding channel members 530 to prevent interference that might otherwise occur between the removable divider 526 and the inwardly directed wall 536 (see FIG. 36) when lifting the removable divider 526 in the vertical direction 534. To assist in locating the divider 526, channels 530 and 532 may be provided to support the opposite edges of the removable divider 526. Accordingly, as illustrated in FIG. 34, the divider may be completely removed to allow a single chamber in communication with the entire metering apparatus 180b. Alternatively, one or more dividers 526 may be inserted to appropriately divide the hopper into two or more areas. In addition, the removable divider may be positioned to change the metering allocation with respect to each area 522, 524. In the example illustrated in FIG. 34, the removable divider 526 may be positioned in the far left position such that only the first metering wheel 192 communicates with the second containment area 524 while the second, third and fourth metering wheels 194, 196, 198 meter material from the first containment area 522. Such an arrangement would allow three parts of the additive 522 to be mixed with one part additive from the area 524. Moreover, as described above, the different metering apparatus arrangements may be selected depending on the additive types in the containment areas. In the position illustrated in FIG. 34, on the other hand, a one-to-one metering ratio may be obtained. In still another further embodiment, the removable divider may be positioned in the far right slot such that the additive contained in area 522 is metered substantially entirely by the fourth metering wheel 198 while the additive contained in the left area 524 would be metered by the three metering wheels 192, 194, 196 such that three parts additive from the area 524 will be metering for every one part additive metered from the area 522.

Figure 37:
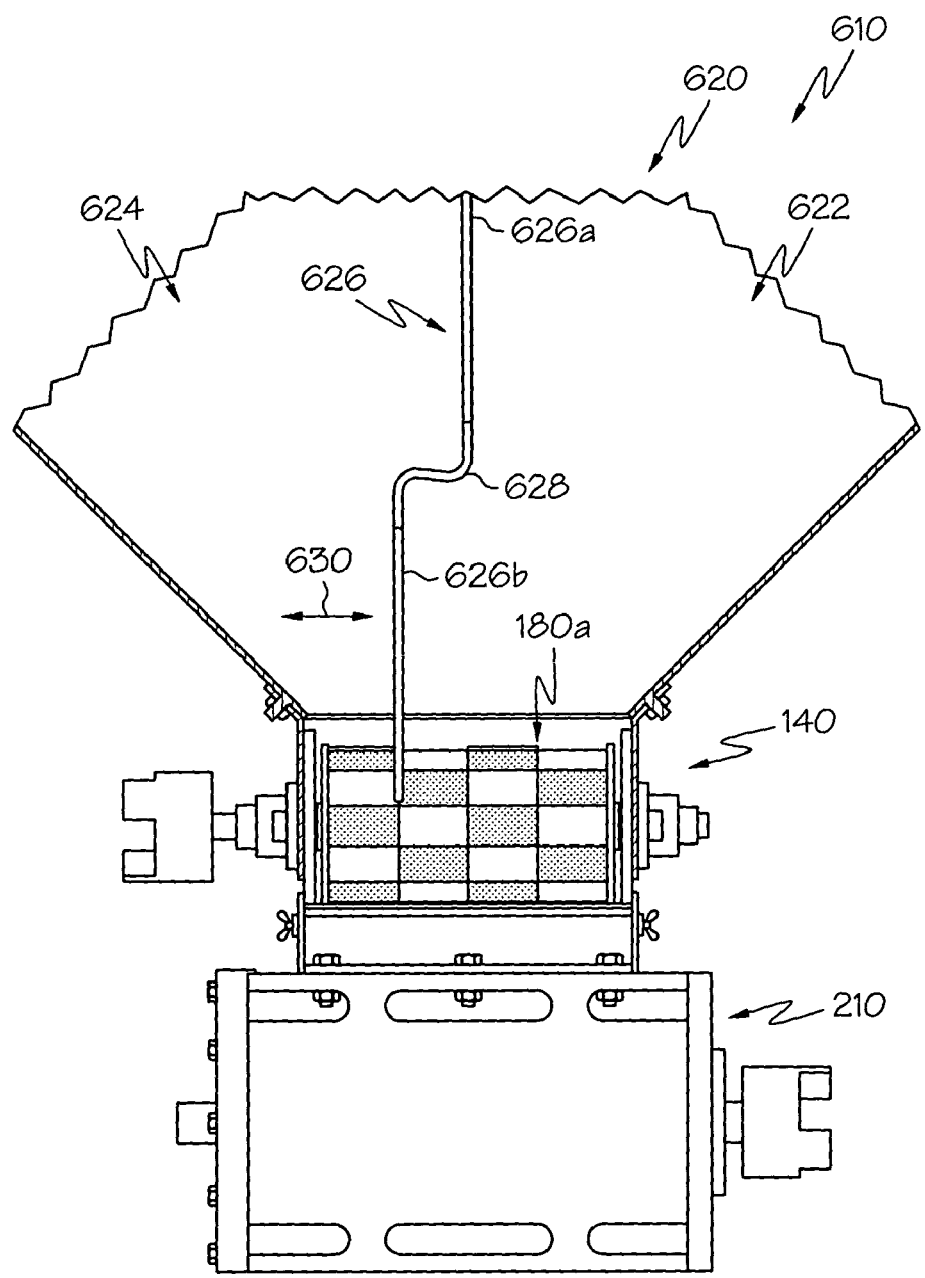
FIG. 37 is yet another exemplary embodiment of portions of a feeding apparatus with a divided hopper.

FIG. 37 illustrates yet another embodiment of a feeding apparatus 610 including hopper 620 for additive. The hopper 620 defines a first containment area 622 and a second containment area 624. The exemplary hopper 620 includes a divider 626 including an upper divider 626a, a lower divider 626b, and a flexible divider 628 extending therebetween. Means may be provided to allow the lower divider 626 to translate laterally along directional arrow 630 to assist in adjusting the metering ratio of additive contained within area 622 with respect to additive material contained in area 624. The lower divider 626b may be continuously adjusted along arrow 630 or incrementally adjusted to one of various positions with respect to the metering apparatus 180a. In addition, although not shown, the entire divider 626 may be a single piece divider that is movable along directional arrow 630.

What is claimed is:

1. A bulk material discharge assembly comprising:
  a) a bulk material hopper;
  b) a conduit for delivering an air stream to entrain with bulk material from the bulk material hopper; and
  c) a feeding apparatus for introducing additive to the conduit comprising,
    i) an additive hopper,
    ii) an airlock positioned adjacent the conduit, the airlock including a rotor rotatably mounted within an interior chamber of the airlock, the airlock including first and second openings that are substantially isolated from one another by the rotor, the second opening positioned adjacent the conduit, and
    iii) a metering device in communication with the additive hopper for metering additive and introducing metered additive to the first opening of the airlock.

2. A bulk material discharge assembly comprising:
  a) a bulk material hopper:
  b) a conduit for delivering an air stream to entrain with bulk material from the bulk material hopper; and
  c) a feeding apparatus for introducing additive to the conduit comprising,
    i) an additive hopper,
    ii) an airlock positioned adjacent the conduit, the airlock including a rotor rotatably mounted within an interior chamber of the airlock, the airlock including first and second openings that are substantially isolated from one another by the rotor, the second opening positioned adjacent the conduit, and
    iii) a metering device in communication with the additive hopper for metering additive and introducing metered additive to the first opening of the airlock, wherein the metering device comprises a metering apparatus including an axle extending along an elongated axis, at least a length of the axle including a cross sectional profile taken along a plane that is perpendicular to the elongated axis, the cross sectional profile having a noncircular perimeter, the metering apparatus further including first and second metering wheels, each metering wheel including:
a) a first side,
b) a second side offset from the first side,
c) a hub with a hub axis and a hub opening with a shape that at least partially corresponds to the noncircular perimeter, wherein each metering wheel is mounted on the axle with each hub axis being collinear with the elongated axis of the axle, and wherein the noncircular perimeter and the shape of each hub opening cooperate to nonrotatably mount each metering wheel to the axle,
d) a plurality of teeth extending away from the hub axis, each wheel being provided with a plurality of cavities, each cavity being defined between two adjacent teeth and extending along a corresponding cavity axis to provide communication from the first side to the second side of the metering wheel, wherein the first and second metering wheel are adapted to be selectively mounted in at least one of a first relative position with respect to one another wherein the cavity axis of at least one first wheel cavity is aligned with the cavity axis of at least one second wheel cavity, and a second relative position wherein the cavity axis of the at least one first wheel cavity is not aligned with the cavity axis of the at least one second wheel cavity, wherein, in the first relative position, each cavity of the first metering wheel communicates with only one corresponding cavity of the second metering wheel.

3. The bulk material discharge assembly of claim 1, wherein the metering device is mounted to the additive hopper and wherein the airlock is mounted to the conduit, the additive hopper being pivotally mounted to portions of the bulk material discharge assembly such that the metering device may be moved away from the airlock by pivoting the additive hopper relative to the portions of the bulk material discharge assembly.

4. A bulk material discharge assembly comprising:
a) a bulk material hopper;
b) a conduit for delivering an air stream to entrain with bulk material from the bulk material hopper; and
c) a feeding apparatus for introducing additive to the conduit comprising.
    i) an additive hopper.
    ii) an airlock positioned adjacent the conduit, the airlock including a rotor rotatably mounted within an interior chamber of the airlock, the airlock including first and second openings that are substantially isolated from one another by the rotor, the second opening positioned adjacent the conduit, and
    iii) a metering device in communication with the additive hopper for metering additive and introducing metered additive to the first opening of the airlock,
wherein the additive hopper includes at least one containment area including an opening for introducing additive to the metering device, and at least one adjustable blocking member adapted to assist in adjusting the size of the opening.

5. A bulk material discharge assembly comprising:
a) a bulk material hopper;
b) a conduit for delivering an air stream to entrain with bulk material from the bulk material hopper; and
c) a feeding apparatus for introducing additive to the conduit comprising,
    i) an axle extending along an elongated axis, at least a length of the axle including a cross sectional profile taken along a plane that is perpendicular to the elongated axis, the cross sectional profile having a noncircular perimeter;
    ii) first and second metering wheels, each metering wheel including:
        1) a first side,
        2) a second side offset from the first side such that an overall width of the metering wheel is substantially disposed between the first and second sides,
        3) a hub with a hub axis and a hub opening with a shape at least partially corresponding to the noncircular perimeter, wherein each metering wheel is mounted on the axle with each hub axis being collinear with the elongated axis of the axle, and wherein the noncircular perimeter and the shape of each hub opening cooperate to nonrotatably mount each metering wheel to the axle,
        4) a plurality of teeth extending away from the hub axis, each wheel being provided with a plurality of cavities, each cavity being defined between two adjacent teeth and extending along a corresponding cavity axis to provide communication from the first side to the second side of the metering wheel, wherein the first and second metering wheel are adapted to be selectively mounted in at least one of a first relative position with respect to one another wherein the cavity axis of at least one first wheel cavity is aligned with the cavity axis of at least one second wheel cavity, and a second relative position wherein the cavity axis of the at least one first wheel cavity is not aligned with the cavity axis of any second wheel cavity.

6. The bulk material discharge assembly of claim 5, wherein, in the first relative position, each cavity of the first metering wheel communicates with at least one cavity of the second metering wheel to define a corresponding enlarged cavity.

7. The bulk material discharge assembly of claim 6, wherein, in the first relative position, each cavity of the first metering wheel communicates with only one corresponding cavity of the second metering wheel.

8. The bulk material discharge assembly of claim 6, wherein, in the second relative position, each cavity of the first metering wheel is substantially prevented from communicating with any cavity of the second metering wheel.

9. The bulk material discharge assembly of claim 6, wherein the first metering wheel and the second metering wheel abut at a common boundary.

10. The bulk material discharge assembly of claim 9, wherein the common boundary is an imaginary plane such that the first and second metering wheels abut one another at the imaginary plane.

11. The bulk material discharge assembly of claim 5, wherein, in the second relative position, each cavity of the first metering wheel is substantially prevented from communicating with any cavity of the second metering wheel.

12. The bulk material discharge assembly of claim 5, wherein the first and second metering wheels are substantially identical.

13. The bulk material discharge assembly of claim 5, wherein each cavity axis of each of the metering wheels are substantially parallel to the elongated axis of the axle.

14. The bulk material discharge assembly of claim 5, wherein the hub axis of each metering wheel is a symmetrical axis of the corresponding metering wheel.

15. The bulk material discharge assembly of claim 14, wherein each metering wheel has a plurality of substantially identical cross-sectional profiles taken along a plurality of planes passing through the corresponding metering wheel that are perpendicular to the symmetrical axis of the corresponding metering wheel.

16. The bulk material discharge assembly of claim 15, wherein each metering wheel has substantially identical cross-sectional profiles taken along all planes passing through the corresponding metering wheel that are perpendicular to the symmetrical axis of the corresponding metering wheel.

17. The bulk material discharge assembly of claim 15, wherein the teeth of each metering wheel extend along a corresponding symmetrical tooth axis that is perpendicular to the symmetrical axis of each corresponding metering wheel.

18. The bulk material discharge assembly of claim 15, wherein the plurality of teeth of each of the metering wheels are radially disposed at equal distances about the symmetrical axis of the corresponding metering wheel.

19. The bulk material discharge assembly of claim 5, wherein the noncircular perimeter and each hub opening define a substantially identical polygonal shape with three or more sides.

20. The bulk material discharge assembly of claim 19, wherein the polygonal shape is a square.

21. The bulk material discharge assembly of claim 20, wherein each metering wheel has six teeth.

22. The bulk material discharge assembly of claim 19, wherein the ratio of metering wheel teeth to sides of the polygonal shape are 6/4.

23. The bulk material discharge assembly of claim 5, wherein the first metering wheel and the second metering wheel abut at a common boundary.

24. The bulk material discharge assembly of claim 23, wherein the common boundary is an imaginary plane such that the first and second metering wheels abut one another at the imaginary plane.

25. The bulk material discharge assembly of claim 23, wherein the common boundary is a boundary plate and wherein the first and second metering wheel each abut the boundary plate.

26. The bulk material discharge assembly of claim 23, wherein the common boundary is a blank wheel and wherein the first and second metering wheel each abut the blank wheel.

27. A bulk material discharge assembly comprising:
a) a bulk material hopper;
b) a conduit for delivering an air stream to entrain with bulk material from the bulk material hopper; and
c) a feeding apparatus for introducing additive to the conduit comprising,
i) an axle extending along an elongated axis, at least a length of the axle including a cross sectional profile taken along a plane that is perpendicular to the elongated axis, the cross sectional profile having a noncircular perimeter;
ii) first and second metering wheels, each metering wheel including:
1) a first side,
2) a second side offset from the first side,
3) a hub with a hub axis and a hub opening with a shape that at least partially corresponds to the noncircular perimeter, wherein each metering wheel is mounted on the axle with each hub axis being collinear with the elongated axis of the axle, and wherein the noncircular perimeter and the shape of each hub opening cooperate to nonrotatably mount each metering wheel to the axle,
4) a plurality of teeth extending away from the hub axis, each wheel being provided with a plurality of cavities, each cavity being defined between two adjacent teeth and extending along a corresponding cavity axis to provide communication from the first side to the second side of the metering wheel, wherein the first and second metering wheel are adapted to be selectively mounted in at least one of a first relative position with respect to one another wherein the cavity axis of at least one first wheel cavity is aligned with the cavity axis of at least one second wheel cavity, and a second relative position wherein the cavity axis of the at least one first wheel cavity is not aligned with the cavity axis of the at least one second wheel cavity, wherein, in the first relative position, each cavity of the first metering wheel communicates with only one corresponding cavity of the second metering wheel.

28. The bulk material discharge assembly of claim 27, wherein, in the second relative position, each cavity of the first metering wheel is substantially prevented from communicating with any cavity of the second metering wheel.

29. A bulk material discharge assembly comprising:
a) an additive hopper including at least one partition for dividing the additive hopper into at least two containment areas that are substantially isolated from one another,
b) a metering device mounted to the additive hopper, the metering device comprises a metering apparatus including an axle extending along an elongated axis, at least a length of the axle including a cross sectional profile taken along a plane that is perpendicular to the elongated axis, the cross sectional profile having a noncircular perimeter, the metering apparatus further including first and second metering wheels, each metering wheel including:
i) a first side,
ii) a second side offset from the first side,
iii) a hub with a hub axis and a hub opening with a shape that at least partially corresponds to the noncircular perimeter, wherein each metering wheel is mounted on the axle with each hub axis being collinear with the elongated axis of the axle, and wherein the noncircular perimeter and the shape of each hub opening cooperate to nonrotatably mount each metering wheel to the axle,
iv) a plurality of teeth extending away from the hub axis, each wheel being provided with a plurality of cavities, each cavity being defined between two adjacent teeth and extending along a corresponding cavity axis to provide communication from the first side to the second side of the metering wheel, wherein the first and second metering wheel are adapted to be selectively mounted in at least one of a first relative position with respect to one another wherein the cavity axis of at least one first wheel cavity is aligned with the cavity axis of at least one second wheel cavity, and a second relative position wherein the cavity axis of the at least one first wheel cavity is not aligned with the cavity axis of the at least one second wheel cavity, wherein, in the first relative position, each cavity of the first metering wheel communicates with only one corresponding cavity of the second metering wheel.

30. The bulk material discharge assembly of claim 29, further including at least one adjustable blocking member adapted to control the size of at least one containment area opening exposed to the metering apparatus.

31. The bulk material discharge assembly of claim 29, wherein each containment area includes an opening exposed to the metering apparatus and the at least one partition is adjustable to control the relative size of the containment area openings with respect to one another.

32. The bulk material discharge assembly of claim 29, wherein the metering apparatus further comprises third and fourth metering wheels, each metering wheel including:
   a) a first side,
   b) a second side offset from the first side,
   c) a hub with a hub axis and a hub opening with a shape that at least partially corresponds to the noncircular perimeter, wherein each metering wheel is mounted on the axle with each hub axis being collinear with the elongated axis of the axle, and wherein the noncircular perimeter and the shape of each hub opening cooperate to nonrotatably mount each metering wheel to the axle,
   d) a plurality of teeth extending away from the hub axis, each wheel being provided with a plurality of cavities, each cavity being defined between two adjacent teeth and extending along a corresponding cavity axis to provide communication from the first side to the second side of the metering wheel, wherein the third and fourth metering wheel are adapted to be selectively mounted in at least one of a first relative position with respect to one another wherein the cavity axis of at least one third wheel cavity is aligned with the cavity axis of at least one fourth wheel cavity, and a second relative position wherein the cavity axis of the at least one third wheel cavity is not aligned with the cavity axis of the at least one fourth wheel cavity, wherein, in the first relative position, each cavity of the third metering wheel communicates with only one corresponding cavity of the fourth metering wheel.

33. The bulk material discharge assembly of claim 32, wherein the at least one partition is adjustable to control the relative size of the containment area openings exposed to the metering apparatus.

34. The bulk material discharge assembly of claim 32, wherein the at least one partition is positioned within the additive hopper such that the first containment area opening is substantially exposed to the first metering wheel while the second containment area opening is substantially exposed to the second, third and fourth metering wheels.

35. The bulk material discharge assembly of claim 32, wherein the at least one partition is positioned within the additive hopper such that the first containment area opening is substantially exposed to the first and second metering wheels while the second containment area opening is substantially exposed to the third and fourth metering wheels.

36. The bulk material discharge assembly of claim 35, wherein the at least one partition is adjustable such that the at least one partition may be adjusted relative to a portion of the additive hopper in at least one of a first position wherein the first containment area opening is substantially exposed to the first metering wheel while the second containment area opening is substantially exposed to the second, third and fourth metering wheels, a second position wherein the first containment area opening is substantially exposed to the first and second metering wheels while the second containment area opening is substantially exposed to the third and fourth metering wheels, and a third position wherein the first containment area opening is substantially exposed to the first, second and third metering wheels while the second containment area opening is substantially exposed to the fourth metering wheel.

37. The bulk material discharge assembly of claim 35, further including at least one adjustable blocking member adapted to control the size of at least one containment area opening exposed to the metering apparatus.

38. The bulk material discharge assembly of claim 32, wherein the at least one partition is positioned within the additive hopper such that the first containment area opening is substantially exposed to the first, second and third metering wheels while the second containment area opening is substantially exposed to the fourth metering wheel.

* * * * *